(12) United States Patent
Mueller et al.

(10) Patent No.: US 10,567,462 B2
(45) Date of Patent: Feb. 18, 2020

(54) APPARATUS AND METHOD FOR CLOUD ASSISTED ADAPTIVE STREAMING

(71) Applicant: bitmovin GmbH, Klagenfurt (AT)

(72) Inventors: Christopher Mueller, Villach (AT); Stefan Lederer, Klagenfurt (AT); Christian Timmerer, Klagenfurt (AT)

(73) Assignee: bitmovin GmbH, Klagenfurt (AT)

( * ) Notice: Subject to any disclaimer, the term of this patent is extended or adjusted under 35 U.S.C. 154(b) by 544 days.

(21) Appl. No.: 14/997,406

(22) Filed: Jan. 15, 2016

(65) Prior Publication Data

US 2016/0134677 A1 May 12, 2016

Related U.S. Application Data

(63) Continuation of application No. PCT/EP2014/065298, filed on Jul. 16, 2014.

(60) Provisional application No. 61/846,617, filed on Jul. 16, 2013.

(51) Int. Cl.
*G06F 15/16* (2006.01)
*H04L 29/06* (2006.01)
*H04L 29/08* (2006.01)

(52) U.S. Cl.
CPC ............ *H04L 65/607* (2013.01); *H04L 67/10* (2013.01)

(58) Field of Classification Search
CPC ..... H04L 65/602; H04L 65/607; H04L 65/80; H04L 67/10; H04L 47/24
USPC ................................. 709/219, 231
See application file for complete search history.

(56) References Cited

U.S. PATENT DOCUMENTS

| 9,559,969 | B2* | 1/2017 | Jaska | ...................... H04L 47/22 |
| 2005/0262257 | A1* | 11/2005 | Major | .............. H04N 21/25808 709/231 |
| 2008/0294789 | A1 | 11/2008 | Nassor et al. | |
| 2009/0300201 | A1* | 12/2009 | Amon | ................. H04L 27/3488 709/231 |

(Continued)

FOREIGN PATENT DOCUMENTS

| EP | 1173028 A2 | 1/2002 |
| EP | 2375680 A1 | 10/2011 |

OTHER PUBLICATIONS

Adobe, "Adobe HTTP Dynamic Streaming", http://www.adobe.com/products/httpdynamicstreaming/ (last access: Mar. 2012), Mar. 2012, 1 page.

(Continued)

*Primary Examiner* — Frantz B Jean
(74) *Attorney, Agent, or Firm* — Michael A. Glenn; Perkins Coie LLP

(57) ABSTRACT

An apparatus for transmitting user data to a server system including one or more servers includes a content encoder for encoding a plurality of portions of the user data to obtain a first data stream, wherein the content encoder is configured to encode each of the plurality of portions with a bandwidth-dependent quality which depends on a bandwidth that is available for transmitting the first data stream from the apparatus to the server system, and includes a transmitter for transmitting the first data stream from the apparatus to the server system. The content encoder is configured to encode two or more of the plurality of portions of the user data to obtain a second data stream, wherein the content encoder is configured to encode each of the two or more of the plurality of portions with a predefined quality.

21 Claims, 11 Drawing Sheets

(56) References Cited

U.S. PATENT DOCUMENTS

| | | | |
|---|---|---|---|
| 2012/0281115 A1 | 11/2012 | Kouncar et al. | |
| 2013/0103849 A1 | 4/2013 | Mao et al. | |
| 2013/0185399 A1* | 7/2013 | Appleby | H04L 65/607 709/219 |
| 2013/0190048 A1* | 7/2013 | Oyman | H04W 28/16 455/557 |
| 2013/0275557 A1* | 10/2013 | Myers | H04N 21/2221 709/219 |
| 2013/0286879 A1* | 10/2013 | ElArabawy | H04N 21/26208 370/252 |
| 2013/0304933 A1* | 11/2013 | Kim | H04L 65/60 709/231 |
| 2013/0336635 A1* | 12/2013 | Randall | G11B 27/105 386/248 |
| 2014/0201334 A1* | 7/2014 | Wang | H04L 65/4084 709/219 |
| 2014/0201368 A1* | 7/2014 | Bouazizi | H04L 67/02 709/225 |
| 2014/0229529 A1* | 8/2014 | Barone | H04L 65/4076 709/203 |
| 2015/0081851 A1* | 3/2015 | Oyman | H04W 74/0833 709/219 |

OTHER PUBLICATIONS

Cervino, J. et al., "Testing a Cloud Provider Network for Hybrid P2P and Cloud Streaming Architectures", In Proceedings of the 4th IEEE International Conference on Cloud Computing, Washington, USA, 2011, pp. 356-363.

Gadea, C. et al., "A Collaborative Cloud-Based Multimedia Sharing Platform for Social Networking Environments", In Proceedings of the Computer Communications and Networks Conference (ICCCN), Maui, Hawaii, Jul. 2011, 6 pages.

Huang, Y. et al., "Cloud Download: Using Cloud Utilities to Achieve High-Quality Content Distribution for Unpopular Videos", In Proceedings of the ACM Multimedia 2011 (MM11), Scottsdale, Arizona, USA, Nov. 28, 2011, pp. 213-222.

Huang, Z. et al., "CloudStream: delivering high-quality streaming videos through a cloud-based SVC proxy", In Proceedings of the IEEE INFOCOM, 2011, pp. 201-205.

ISO/IEC DIS 23001-6, "Information technology—MPEG systems technologies—Part 6: Dynamic adaptive streaming over HTTP (DASH)", ISO/IEC DIS 23001-6, Part 1: Media Presentation Description and Segment Formats, 2011, pp. 1-152.

Jin, X. et al., "Cloud Assisted P2P Media Streaming for Bandwidth Constrained Mobile Subscribers", In Proceedings of the 16th International Conference on Parallel and Distributed Systems, Shanghai, China, 2010, pp. 800-805.

Lederer, S. et al., "Peer-Assisted Dynamic Adaptive Streaming over HTTP—System Design and Evaluation", In Proceedings of the IEEE International Packet Video Workshop 2012 (PV12), Munich, Germany, May 10-11, 2012, May 10, 2012, 6 pages.

Liu, Y., "Towards Efficient Resource Utilization in Internet Mobile Streaming", In Proceedings of the ACM Multimedia 2011 (MM11), Scottsdale, Arizona, USA, Nov. 28, 2011, 1 page.

Mueller, C. et al., "An Evaluation of Dynamic Adaptive Streaming over HTTP in Vehicular Environments", In Proceedings of the 4th Workshop on Mobile Video (MoVid12) and the ACM Multimedia Systems Conference 2012 (MMSys12), Chapel Hill, North Carolina, USA,, Feb. 2012, pp. 37-42.

Ni, P. et al., "Spatial Flicker Effect in Video Scaling", In Proceedings of the third international Workshop an Quality of Multimedia Experience (QOMEX'11), Mechelen, Belgium, Sep. 2011, pp. 55-60.

Pantos, R. et al., "HTTP Live Streaming", IETF draft, http://tools.ietf.org/html/draft-pantos-http-live-streaming-07 (last access: Mar. 2012), Nov. 19, 2015, pp. 1-49.

Sanchez, Y. et al., "iDASH: Improved Dynamic Adaptive Streaming over HTTP using Scalable Video Coding", In Proceedings of the ACM Multimedia Systems 2011 (MMSys11), San Jose, CA, Feb. 2011, pp. 257-264.

Schwartz, H. et al., "Overview of the Scalable Video Coding Extensions of the H.264/AVC Standard", In Proceedings of the IEEE Transactions on Circuits and Systems for Video Technology, Sep. 2007, pp. 1103-1120.

Simoens, P. et al., "Remote Display Solutions for Mobile Cloud Computing", IEEE Computer, Proposed optimization techniques address the major challenges that varying wireless channel conditions, short battery lifetime, and interaction latency pose for the remote display of cloud applications on mobile devices., 2011, pp. 46-53.

Stockhammer, T. , "Dynamic Adaptive Streaming over HTTP—Standards and Design Principles", In Proceedings of the ACM Multimedia Systems (MMSys11), San Jose, California, USA, Feb. 2011, pp. 133-143.

Wang, B. et al., "Multimedia Streaming via TCP: An Analytic Performance Study", In Proceedings of the ACM Transactions on Multimedia Computing, Communication and Applications, vol. 4, No. 2, May 2008, pp. 16:1-16:22.

Wiegand, T. et al., "Overview of the H.264/AVC Video Coding Standard", In Proceedings of the IEEE Transactions on Circuits and Systems for Video Technology, vol. 13, No. 7, Jul. 2003, pp. 560-576.

Wu, Dapeng et al., "Scalable Video Coding and Transport over Broad-Band Wireless Networks", Proceedings of the IEEE, IEEE. New York, US, vol. 89, No. 1, Jan. 1, 2001, pp. 6-20.

Zambelli, A. , "IIS Smooth Streaming Technical Overview", Technical Report, Microsoft Corporation, Mar. 2009, pp. 1-4.

* cited by examiner

APPARATUS AND METHOD FOR CLOUD ASSISTED ADAPTIVE STREAMING

CROSS-REFERENCE TO RELATED APPLICATIONS

This application is a continuation of copending International Application No. PCT/EP2014/065298, filed Jul. 16, 2014, which claims priority from U.S. Provisional Application No. 61/846,617, filed Jul. 16, 2013, which are each incorporated herein in its entirety by this reference thereto.

The present invention relates to user data encoding, streaming and decoding, and, in particular, to an apparatus and method for cloud assisted adaptive streaming.

BACKGROUND OF THE INVENTION

Multimedia is nowadays ubiquitous in the Internet and many web applications that are already based on HTTP are utilizing this protocol for multimedia streaming.

For example, multimedia streaming is conducted by adopting progressive download Netflix, Hulu and Vudu, which are just a few prominent examples, which have deployed their streaming service over the top. Interestingly, this streaming approach works pretty well, which implies that the assumption of former video streaming research, that streaming on top of the Transmission Control Protocol (TCP) will not work smoothly due to its retransmission delay and throughput variations, could be seen as an illusion. Furthermore, HTTP streaming has some advantages compared to traditional streaming approaches, which are mainly based on the Real-Time Transport Protocol (RTP) and the User Datagram Protocol (UDP). The HTTP architecture is well deployed and the protocol is widely accepted. Therefore it is possible to traverse Firewalls and handle Network Address Translation (NAT) without any configuration effort, which is one of the major advantages of HTP streaming. However there are certain disadvantages when using HTTP and as a consequence TCP for multimedia streaming. In particular, the combination of TCP and HTTP introduces a significant overhead compared to RTP, which commonly uses UDP as carrier protocol (see [13]).

Another disadvantage is the inflexibility in case of varying bandwidth conditions which are common in networks that are based on the Internet Protocol (IP). Therefore, ISO/IEC MPEG has recently ratified an advancement of that basic HTTP streaming approach. which is referred to as Dynamic Adaptive Streaming over HTTP (DASH, see [3]). In comparison to traditional HTTP streaming, this approach is able to handle varying bandwidth conditions while maintaining its advantages, such as NAT/firewall traversal and flexible deployment. Additionally, major industry players including Microsoft (see [14]), Apple (see [15]), and Adobe (see [16]) have deployed their proprietary solutions and interestingly all of them are based on the same principle, which means that the streaming logic is located al the client side and multiple versions of the content, e.g., different resolution, bitrate, language, codec etc. have been segmented and stored on ordinary webservers.

FIG. 5 depicts a DASH streaming scenario and the behavior of the client. The control server provides three qualities, namely best, medium and low that the client could select according to its available bandwidth. Considering such a scenario the first request of the client would be for the so-called Media Presentation Description (MPD). The MPD describes the temporal dependencies of the segments, the capabilities e.g. resolution, codec, bitrate, language etc. and the location of each segment. This information is needed by the client so that it could request the individual segments that fit to its bandwidth requirements or user preferences. In case of a live session the client would have to update the MPD in given intervals so that it gets the location and capabilities of the newly generated segments. As shown in FIG. 5, after the client has downloaded and analyzed the MPD it cloud start to request the segments that fit to its bandwidth conditions.

In FIG. 5 at the beginning, where the client requests two segments of low quality, according to the bandwidth conditions. Afterwards, it adapts to the available bandwidth and switches to a higher quality level i.e. best.

Streaming approaches that are utilizing cloud services are currently very popular, due to the fact that the whole streaming service could be offloaded to a cloud.

In general, one or more servers may be considered as a cloud. For example, a server system comprising one or more servers can be considered as a cloud.

The above-described offloading and using software more as a service, than something that is locally installed, seems to be an interesting principle, especially for mobile devices, due to their limited hardware and storage capacities. Nevertheless, such a cloud streaming architecture introduces also some new challenges, for the simple reason that the software or multimedia content will now be requested from the cloud through the internet but the user expectations in case of Quality of Experience (QoE) i.e. low startup delay, smoothness (see [1]) etc. should not differ between playing a locally and remotely stored media file.

This is in particular a problem for mobile devices, which are often connected to the internet through an interface with high bandwidth fluctuations.

SUMMARY

According to an embodiment, an apparatus for transmitting user data to a server system including one or more servers may have: a content encoder for encoding a plurality of portions of the user data to acquire a first data stream, wherein the content encoder is configured to encode each of the plurality of portions with a bandwidth-dependent quality which depends on a bandwidth that is available for transmitting the first data stream from the apparatus to the server system, and a transmitter for transmitting the first data stream from the apparatus to the server system, wherein the content encoder is configured to encode two or more of said plurality of portions of the user data to acquire a second data stream, wherein the content encoder is configured to encode each of said two or more of said plurality of portions with a predefined quality, wherein the bandwidth-dependent quality of one or more of the portions being encoded within the first data stream is lower than the predefined quality, and wherein the transmitter is configured to transmit the second data stream from the apparatus to the server system.

According to another embodiment, a server system may have one or more servers, wherein the server system is configured to receive a first input data stream, wherein a plurality of portions of user data are encoded within the first input data stream, wherein each of the plurality of portions being encoded within the first input data stream has a portion-specific quality, wherein the server system is configured to receive a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality, wherein the one or more servers, of the server system are configured to generate one or more output data streams by processing at least one of the first input data stream and the second input data stream such that for each of the one or more output data streams, said plurality of portions of said user data are encoded within said output data stream with an output quality, and wherein the one or more servers of the server system are configured to generate each of the one or more output data streams such that the output quality of said plurality of portions of said user data is lower than or equal to a requested quality.

According to another embodiment, a system may have: at least one apparatus for transmitting user data to a server system including one or more servers, which apparatus may have: a content encoder for encoding a plurality of portions of the user data to acquire a first data stream, wherein the content encoder is configured to encode each of the plurality of portions with a bandwidth-dependent quality which depends on a bandwidth that is available for transmitting the first data stream from the apparatus to the server system, and a transmitter for transmitting the first data stream from the apparatus to the server system, wherein the content encoder is configured to encode two or more of said plurality of portions of the user data to acquire a second data stream, wherein the content encoder is configured to encode each of said two or more of said plurality of portions with a predefined quality, wherein the bandwidth-dependent quality of one or more of the portions being encoded within the first data stream is lower than the predefined quality, and wherein the transmitter is configured to transmit the second data stream from the apparatus to the server system,
and a server system including one or more servers, wherein the server system is configured to receive a first input data stream, wherein a plurality of portions of user data are encoded within the first input data stream, wherein each of the plurality of portions being encoded within the first input data stream has a portion-specific quality, wherein the server system is configured to receive a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality, wherein the one or more servers, of the server system are configured to generate one or more output data streams by processing at least one of the first input data stream and the second input data stream such that for each of the one or more output data streams, said plurality of portions of said user data are encoded within said output data stream with an output quality, and wherein the one or more servers of the server system are configured to generate each of the one or more output data streams such that the output quality of said plurality of portions of said user data is lower than or equal to a requested quality,
wherein each of the at least one apparatus is configured to transmit a first input data stream and a second input data stream to the server system.

According to another embodiment, a method for transmitting user data to a server system including one or more servers may have the steps of: encoding a plurality of portions of the user data to acquire a first data stream, wherein encoding each of the plurality of portions is conducted with a bandwidth-dependent quality which depends on a bandwidth that is available for transmitting the first data stream from the apparatus to the server system, transmitting the first data stream from the apparatus to the server system, encoding two or more of said plurality of portions of the user data to acquire a second data stream, wherein encoding each of said two or more of said plurality of portions is conducted with a predefined quality, wherein the bandwidth-dependent quality of one or more of the portions being encoded within the first data stream is lower than the predefined quality, and transmitting the second data stream from the apparatus to the server system.

According to another embodiment, a method may have the steps of: receiving a first input data stream, wherein a plurality of portions of user data are encoded within the first input data stream, wherein each of the plurality of portions being encoded within the first input data stream has a portion-specific quality, receiving a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality, generating one or more output data streams by processing at least one of the first input data stream and the second input data stream such that for each of the one or more output data streams, said plurality of portions of said user data are encoded within said output data stream with an output quality, and generating each of the one or more output data streams such that the output quality of said plurality of portions of said user data is lower than or equal to a requested quality.

According to another embodiment, a non-transitory digital storage medium may have computer-readable code stored thereon to perform the inventive methods when said storage medium is run by a computer or signal processor.

An apparatus for transmitting user data to a server system comprising one or more servers is provided. The apparatus comprises a content encoder for encoding a plurality of portions of the user data to obtain a first data stream, wherein the content encoder is configured to encode each of the plurality of portions with a bandwidth-dependent quality which depends on a bandwidth that is available for transmitting the first data stream from the apparatus to the server system. Moreover, the apparatus comprises a transmitter for transmitting the first data stream from the apparatus to the server system. The content encoder is configured to encode two or more of said plurality of portions of the user data to obtain a second data stream, wherein the content encoder is configured to encode each of said two or more of said plurality of portions with a predefined quality, wherein the bandwidth-dependent quality of one or more of the portions being encoded within the first data stream is lower than the predefined quality. Moreover, the transmitter is configured to transmit the second data stream from the apparatus to the server system.

In some embodiments, the transmitter may, e.g., be configured to transmit the second data stream only if, besides the bandwidth for the first data stream (e.g., a live signal), there is still bandwidth for a second data stream, or, if the transmission of the first data stream is completed.

According to an embodiment, the content encoder may, for example, encode the plurality of portions of the user data within the first data stream (first encoding chain) so that the bit rate resulting from transmitting the encoded portions of the user data corresponds to the available bandwidth, e.g., for transmission from the apparatus to the server system. According to an embodiment, the user data may, for example, be encoded within the second data stream (second encoding chain) with the best quality.

In an embodiment, the content encoder may, e.g., be configured to encode all of the portions of the user data, which have been encoded within the first data stream with a bandwidth-dependent quality being lower than the predefined quality, within the second data stream with the predefined quality.

According to an embodiment, portions (e.g., segments) of the second data stream/of the second encoding chain are stored by the apparatus, e.g., by a client, until they can be uploaded (e.g., until they can be uploaded to a server), for example, when bandwidth is free/available.

According to an embodiment, the content encoder may, e.g., be configured to not encode one or more of the portions of the user data, which have been encoded within the first data stream with a bandwidth-dependent quality being equal to the predefined quality, within the second data stream.

In an embodiment, the content encoder may, e.g., be configured to not encode any of the portions of the user data, which have been encoded within the first data stream with a bandwidth-dependent quality being equal to the predefined quality, within the second data stream.

According to an embodiment, the apparatus may, e.g., further comprise a bandwidth determiner, wherein the first data stream comprises a plurality of segments. The bandwidth determiner may, e.g., be configured to determine a determined quality as the bandwidth-dependent quality for encoding one of the plurality of portions of the user data depending on a transmission time for transmitting one or more of the segments from the apparatus to the server system. Moreover, the content encoder may, e.g., be configured to encode said one of the plurality of portions depending on the determined quality.

In an embodiment, the user data may, e.g., be image data or video data, wherein the bandwidth-dependent quality may, e.g., depend on at least one of a first image resolution and a first image quantization, or may, e.g., depend on at least one of a first video resolution and a first video quantization, and wherein the predefined quality may, e.g., depend on at least one of a second image resolution and a second image quantization, or may, e.g., depend on at least one of a second video resolution and a second video quantization.

The term image resolution may, e.g., relate to a number of pixels of an image of a certain size, the term image quantization, may, for example, relate to a number of different pixel color or greyscale values, from which the pixel is chosen. For example, if a first image of a certain size has 150×200 pixels than its image resolution is lower than the image resolution of a second image of the same size having 300×400 pixels. Moreover, for example, if the pixel value of each of the pixels of a third image are selected from 16 greyscale values than its image quantization is lower than the image quantization of a fourth image with pixels, the pixel values of which are chosen from 256 greyscale values. The terms video resolution and video quantization may, e.g., be defined similarly.

According to an embodiment, the user data is audio data, wherein the bandwidth-dependent quality is indicated by a first compression factor, and wherein the predefined quality is indicated by a second compression factor.

In an embodiment, the apparatus may, e.g., be a mobile device.

According to an embodiment, the user data is a photo being recorded by a camera of the mobile device, or wherein the user data is a video being recorded by the camera of the mobile device, or wherein the user data is an audio recording being recorded by a microphone of the mobile device.

Moreover, a server system is provided. The server system comprises one or more servers. The server system is configured to receive a first input data stream, wherein a plurality of portions of user data are encoded within the first input data stream, wherein each of the plurality of portions being encoded within the first input data stream has a portion-specific quality. Furthermore, the server system is configured to receive a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality. The one or more servers of the server system are configured to generate one or more output data streams by processing at least one of the first input data stream and the second input data stream such that for each of the one or more output data streams, said plurality of portions of said user data are encoded within said output data stream with an output quality. Moreover, the one or more servers of the server system are configured to generate each of the one or more output data streams such that the output quality of said plurality of portions of said user data is lower than or equal to a requested quality.

According to an embodiment, the server system may, e.g., request ("pull") the first input data stream and the second input data stream from the apparatus for transmitting user data (which may, e.g., be referred to as a (content-producing) client), and the server may measure the bandwidth. Such an embodiment may be referred to as "server-driven" or as a "pull" concept.

According to another embodiment, the apparatus for transmitting user data (e.g., the "client") may transmit ("push") the first input data stream and the second input data stream on its own initiative to the server system, and the apparatus for transmitting user data (e.g., the "(content-producing) client") may itself measure the bandwidth. Such an embodiment may be referred to as "client-driven" or as a "push" concept.

In an embodiment, the one or more servers of the server system may, e.g., be configured to generate at least one of the one or more output data streams by processing one or more of the portions of said user data being encoded with the predefined quality within the second input data stream and by processing one or more of the portion of said user data, which are not encoded within the second input data stream and which are encoded within the first input data stream.

In some embodiments, the one or more output data streams are generated by the server. However, in other embodiments, the one or more servers of the server system are configured to generate the one or more output data streams if at least one client requests that one of the one or more output data streams shall be generated. The one or more servers of the server system may, e.g., be configured to not generate any of the one or more output data streams if no client requests that any of the one or more output data streams shall be generated.

According to an embodiment, the one or more servers may, e.g., be configured to generate two or more output data streams, if a first client requests a first one of the output data streams with said plurality of portions of user data being encoded with a first quality, and if a second client requests a second one of the output data streams with said plurality of portions of user data being encoded with a second quality, said second quality being different from the first quality.

Moreover, a system is provided. The system comprises at least one apparatus according to one of the above-described embodiments, and a server system according to one of the above-described embodiments. Each of the at least one apparatus is configured to transmit a first input data stream and a second input data stream to the server system.

In a particular embodiment, the system may, e.g., further comprise one or more consumer clients. Each of the one or more consumer clients may, e.g., be configured to request an output data stream from the server system. The server system may, e.g., be configured to generate the output data stream, being requested by one of the one or more consumer clients, from at least one of the first input data stream and the second input data stream, and to provide the output data stream to said one of the one or more consumer clients.

Moreover, a method for transmitting user data to a server system comprising one or more servers is provided. The method comprises:

Encoding a plurality of portions of the user data to obtain a first data stream, wherein encoding each of the plurality of portions is conducted with a bandwidth-dependent quality which depends on a bandwidth that is available for transmitting the first data stream from the apparatus to the server system.

Transmitting the first data stream from the apparatus to the server system.

Encoding two or more of said plurality of portions of the user data to obtain a second data stream, wherein encoding each of said two or more of said plurality of portions is conducted with a predefined quality, wherein the bandwidth-dependent quality of one or more of the portions being encoded within the first data stream is lower than the predefined quality. And:

Transmitting the second data stream from the apparatus to the server system.

In some embodiments, transmitting the second data stream may, e.g., only be conducted if, besides the bandwidth for the first data stream (e.g., a live signal) there is still bandwidth for a second data stream, or, if the transmission of the first data stream is completed.

Furthermore, another method is provided. The method comprises:

Receiving a first input data stream, wherein a plurality of portions of user data are encoded within the first input data stream, wherein each of the plurality of portions being encoded within the first input data stream has a portion-specific quality.

Receiving a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality.

Generating one or more output data streams by processing at least one of the first input data stream and the second input data stream such that for each of the one or more output data streams, said plurality of portions of said user data are encoded within said output data stream with an output quality. And:

Generating each of the one or more output data streams such that the output quality of said plurality of portions of said user data is lower than or equal to a requested quality.

Moreover, a computer program for implementing the above-described method when being executed on a computer or signal processor is provided.

Moreover, in an embodiment, a cloud offers a kind of automatic scaling.

Some embodiments provide cloud assisted adaptive streaming. Cloud based systems are convincing more and more users due to the fact that they simplify content distribution over various devices, as a consequence that the content is stored in the cloud. Offline media libraries where users download video and audio content and replicate it to their multiple devices by their own will get outdated with the decreasing prices or even free cloud storage space. Furthermore, especially mobile devices benefit from the cloud approach, due to their limited storage capacity. This means that the users will now consume their content on various devices with different capabilities, e.g., screen resolution, available codecs and bandwidth etc. on-demand from the cloud storage, with the requirement that the Quality of Experience (QoE) should not differ from the QoE that the user normally perceives when playing a locally stored media file, i.e., low startup delay, smooth playback etc.

Concepts are provided on how to enhance cloud based multimedia services with Peer-Assisted Dynamic Adaptive Streaming over HTTP (DASH). DASH has been recently standardized within ISO/IEC MPEG and enables the transferring of media on top of HTTP, which has several advantages, due to the fact that the whole internet infrastructure could be utilized. Such a streaming approach is especially suitable for mobile use cases due to its bandwidth flexibility and energy efficiency. According to some embodiments, DASH is used as one of the representatives thereof. In some embodiments, DASH is employed with a peer to peer approach to utilize the upstream bandwidth of the cloud storage users.

Additionally, layered coding has been used for the media to enhance the caching efficiency and decrease the used storage capacity in the cloud. The consequence of this combination of features and the usage of DASH is that the QoE expectations of the users could be met, without changing the network architecture and therefore without massive investments.

In an embodiment, Dynamic Adaptive Streaming over HTTP (DASH) (see [2]), which has recently been standardized by ISO/IEC MPEG (see [3]) is employed to handle that varying bandwidth between the cloud and the content producer or consumer. Additionally, DASH is also more energy efficient compared to progressive download or pure P2P approaches, which is a major benefit for mobile devices (see [4]).

A consequence of the consistent use of HTTP, its stateless design and the chunk based streaming approach is that this system scales very well, which is important for a cloud service. This means that the deployment of DASH in the cloud does not need any changes in the streaming architecture. Moreover, the whole internet infrastructure, e.g., proxies, caches, Content Distribution Networks (CDN) etc. could be reused, which enables some automatic outsourcing of the load, from the cloud, to the surrounding networks. Besides that, ordinary HTTP proxy caches can be used inside of the cloud or at the edges to enhance the streaming performance.

According to some embodiments, cloud streaming features are employed. In embodiments, adaptive streaming, for example, using DASH as an example of such technology, and cloud features could be combined to enhance the streaming performance and the QoE of the users. Multimedia content generation and consumption according to embodiments have been analyzed and extended with a cloud based DASH streaming approach.

The content generation scenario mainly focuses on mobile devices, due to the fact that this is a very challenging use case [5]. The proposed streaming approach offloads the computation complexity to the cloud and increases the battery lifetime, due to the chunk based transferring that will only be done when needed. The cloud acts in that scenario as streaming coordinator, with the main objective to guarantee a smooth playback for the content consumers and efficient bandwidth utilization with low energy consumption at the mobile content producer device.

A second part is the content consumption part that focuses on transcoding (for transcoding, see [6]) in the cloud and content distribution. Transcoding, for example, to H.264/SVC (Scalable Video Coding) (see [7]), could definitely bring caching advantages, due to its layered architecture (see [8]). Some of the provided concepts are a combination of several baselayers, e.g., one base layer per device class and additional SNR scalability, with, for example, up to four layers, for each class.

According to an embodiment, the content encoder of the apparatus for transmitting user data may, e.g., be configured to encode each of the plurality of portions of the user data to obtain the first data stream by encoding each of the portions of the user data by encoding one or more quality layers of said portion of the user data within the first data stream, wherein the bandwidth-dependent quality may, e.g., depend on a number of the quality layers being encoded within the first data stream, wherein the content encoder may, e.g., be configured to determine the number of the quality layers depending on the bandwidth that is available for transmitting the first data stream from the apparatus to the server system, and wherein the content encoder may, e.g., be configured to encode at least one of the plurality of portions of the user data to obtain the second data stream by encoding one or more further quality layers of said at least one of the plurality of portions of the user data.

Moreover, according to an embodiment, the server system may, e.g., be configured to receive the first input data stream, wherein said plurality of portions of the user data are encoded within the first input data stream as one or more quality layers of each of said plurality of portions of the user data. The one or more servers of the server system may, e.g., be configured to obtain said plurality of portions with the portion-specific quality by processing the one or more quality layers of each of the plurality of portions of the user data being encoded within the first input data stream. The server system may, e.g., be configured to receive the second input data stream, wherein said two or more of said plurality of portions of the user data are encoded within the second input data stream as one or more further quality layers of each of said two or more of said plurality of portions of the user data. The one or more servers of the server system may, e.g., be configured to obtain said two or more of said plurality of portions of the user data with the predefined quality depending on the one or more quality layers of said two or more of said plurality of portions of the user data being encoded within the first input data stream and depending on the one or more further quality layers of said two or more of said plurality of portions of the user data being encoded within the second data stream.

Furthermore, the cloud may, for example, cluster clients with an intelligent request dispatching principle that is based on the capabilities of the devices, e.g., resolution, codec. language etc. (see [9]). This clustering generates an overlay, which will further enhance the Peer assisted DASH (see [10]) approach. A consequence of the clustering is that the segments can be more efficiently reused among the peers in a cluster.

According to some embodiments, the cloud architecture is based on Cervino et. al. (see [11]) and Huang el. al. (see [12]). Cervino et al. (see [11]) shows that the strategic placing of server peers in datacenters of the major continents and utilizing the fast interconnection between these datacenters improves the streaming performance. Huang et. al. (12) has shown that the strategic placing of cache servers with a Least Frequently Used (LFU) caching strategy in the networks of the major Internet Service Providers (ISP) should increase the streaming performance. Therefore, a combination of these two cloud architectures has been provided, which should further increase the streaming performance.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
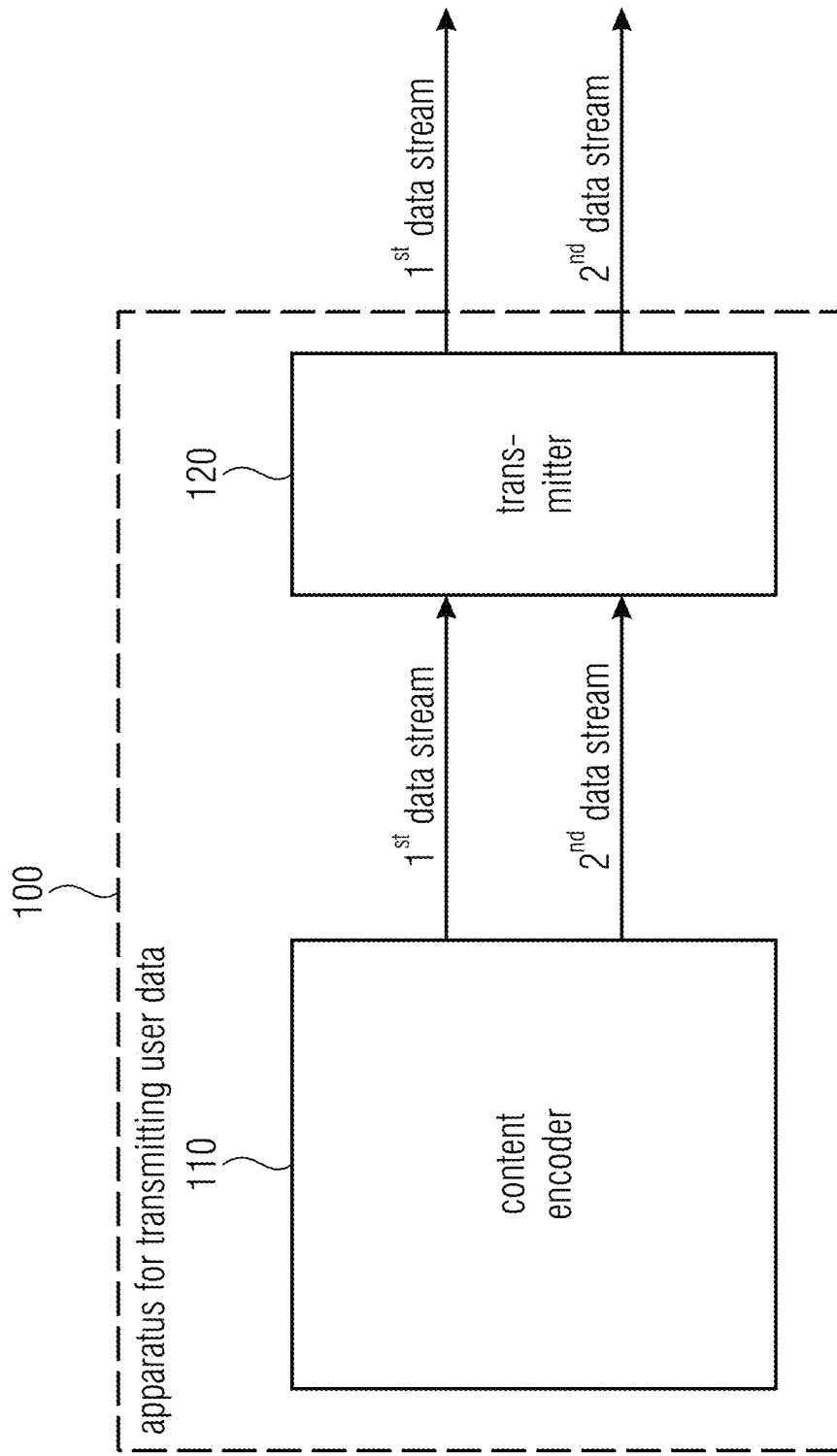
FIG. 1 illustrates an apparatus for transmitting user data according to an embodiment.

FIG. 1 illustrates an apparatus 100 for transmitting user data to a server system 200 comprising one or more servers 210, 220 according to an embodiment.

Figure 2:
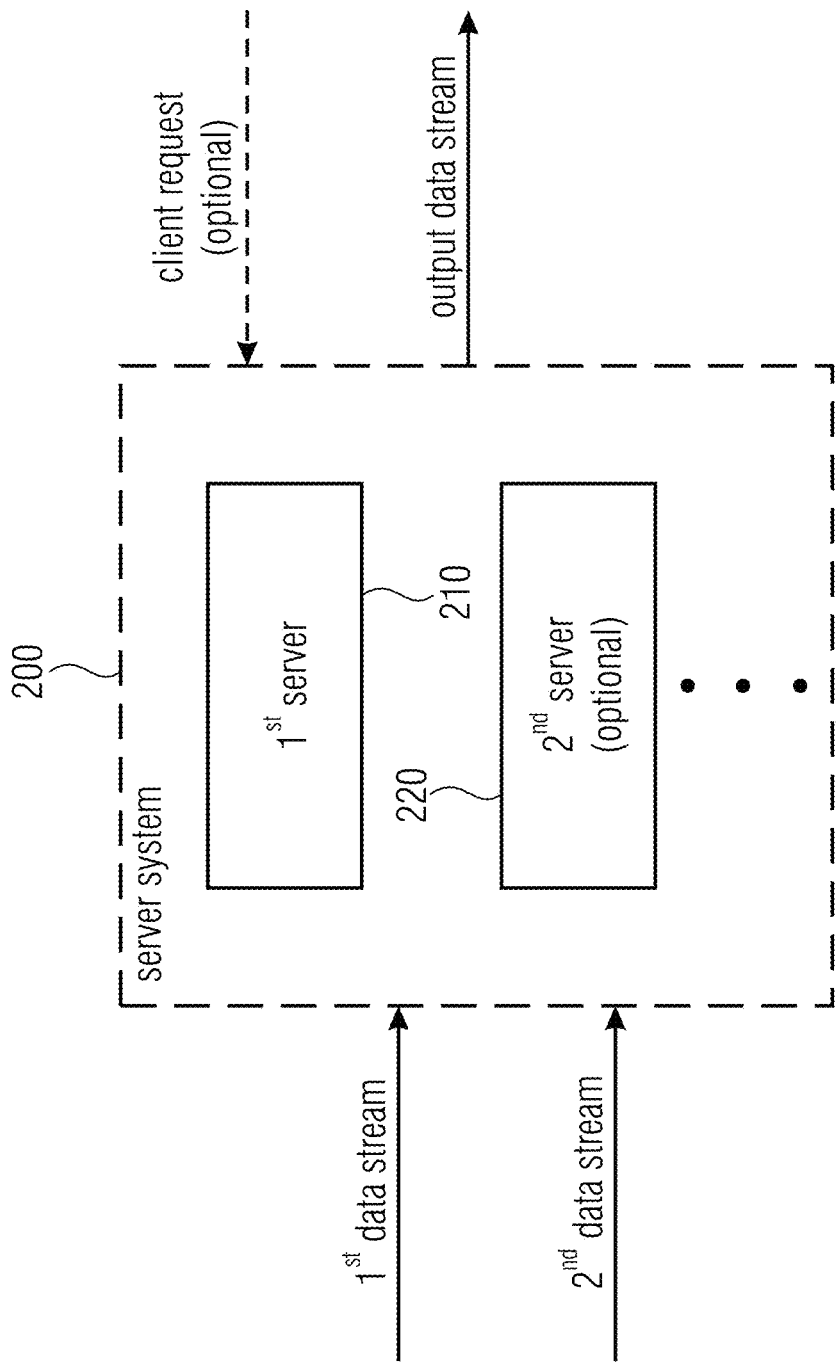
FIG. 2 illustrates a server system according to an embodiment.

FIG. 2 illustrates such a server system 200 comprising two servers 210, 220, a first server 210 and, optionally, a second server 220, according to an embodiment. Such a server system may also be referred to as a cloud.

Figure 3:
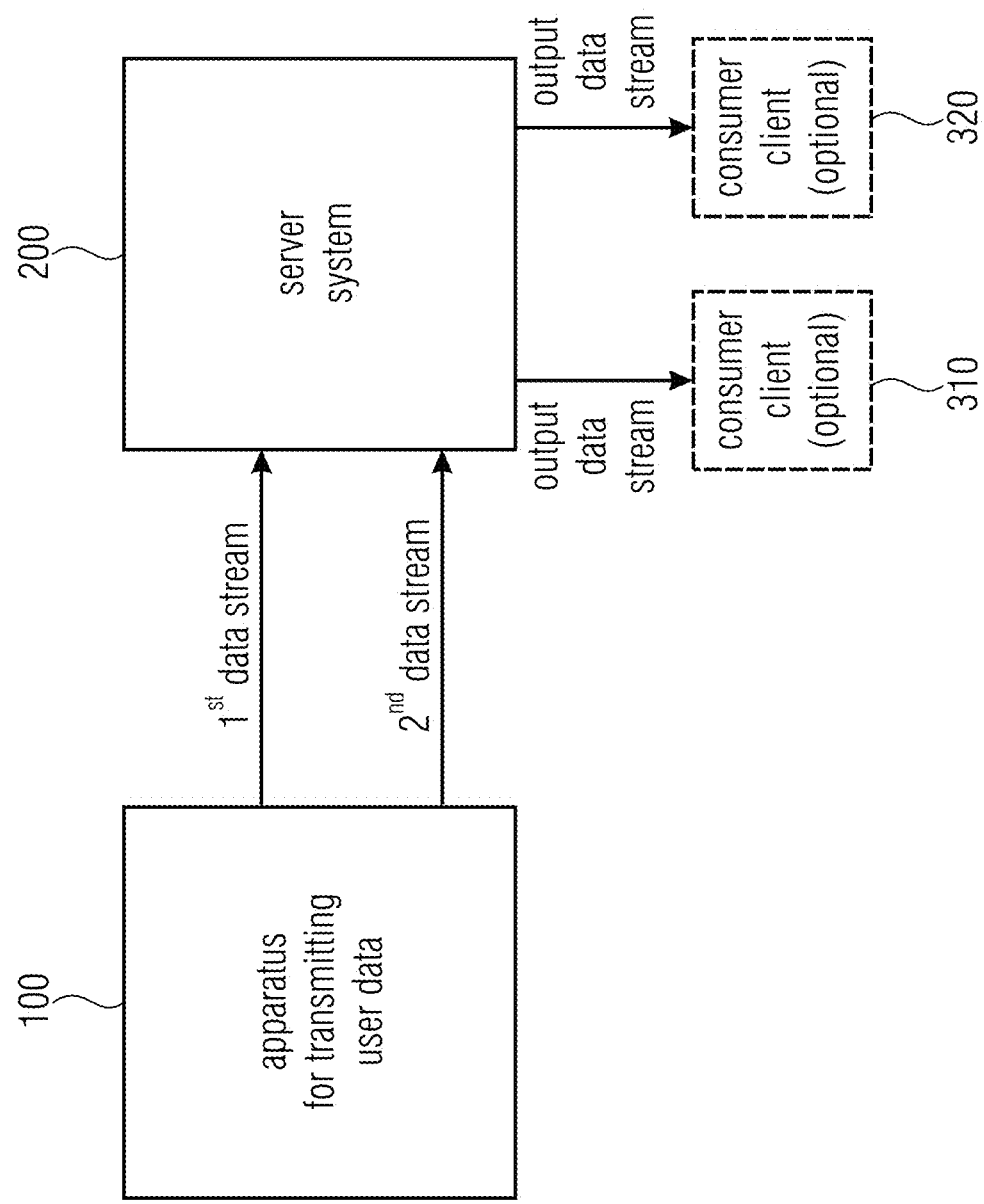
FIG. 3 illustrates a system comprising an apparatus according to an embodiment and a server system according to an embodiment.

FIG. 3 illustrates a system comprising the apparatus 100 and the server system 200.

In FIG. 1, the apparatus 100 comprises a content encoder 110 for encoding a plurality of portions of the user data to obtain a first data stream. The content encoder 110 is configured to encode each of the plurality of portions with a bandwidth-dependent quality which depends on a bandwidth that is available for transmitting the first data stream from the apparatus 100 to the server system 200.

Moreover, the apparatus 100 comprises a transmitter 120 for transmitting the first data stream from the apparatus 100 to the server system 200.

For example, the server system 200 may, e.g., then spread the transmitted user data to consumer clients which request the user data. The user data may, e.g., be a video being encoded in different qualities, for example, in a low quality for meeting real time requirements of a live stream and in a high quality for later non-real-time on demand requests.

The content encoder 110 is configured to encode two or more of said plurality of portions of the user data to obtain a second data stream. Moreover, the content encoder 110 is configured to encode each of said two or more of said plurality of portions with a predefined quality, wherein the bandwidth-dependent quality of one or more of the portions being encoded within the first data stream is lower than the predefined quality.

The transmitter 120 is configured to transmit the second data stream from the apparatus to the server system.

In other words, encoded portions of user data are transmitted from the apparatus 100 to the server system 200 employing at least two data streams. In the first data stream, at least some of the portions of the user data are encoded with a lower quality than the encoded portions in the second data stream. In the second data stream the encoded portions of the user data have in any case the predefined quality, which may be an optimal quality.

For example, the first data stream may be a live stream which may have to meet real time requirements. The second data stream may be a data stream transmitted to the server system 200 after the first data stream is transmitted to the server system 200. While all portions of the user in the second data stream may, e.g., be transmitted with the predefined quality (e.g., an optimal/best quality), the quality of some or all portions encoded within the first data stream may be lower than the predefined best quality.

The quality of the portions encoded within the first data stream is a bandwidth dependent quality which depends on a bandwidth that is available for transmitting the first data stream from the apparatus 100 to the server system 200.

For example, if the bandwidth available allows to transmit 4 seconds of a video of a certain quality being encoded within the first data stream to the server system 200 within 2 seconds of transmission time, then the quality of the video may be increased, as such an increase of quality, which results in an increased bit rate demand, is still acceptable to meet real time requirements.

However, if, for example, the bandwidth available only allows to transmit 4 seconds of a video of a certain quality being encoded within the first data stream to the server system 200 within 6 seconds of transmission time, then the quality of the video should be lowered/reduced, as such a reduction of quality, which results in a reduced bit rate demand, is appears useful to meet real time requirements.

Figure 4:
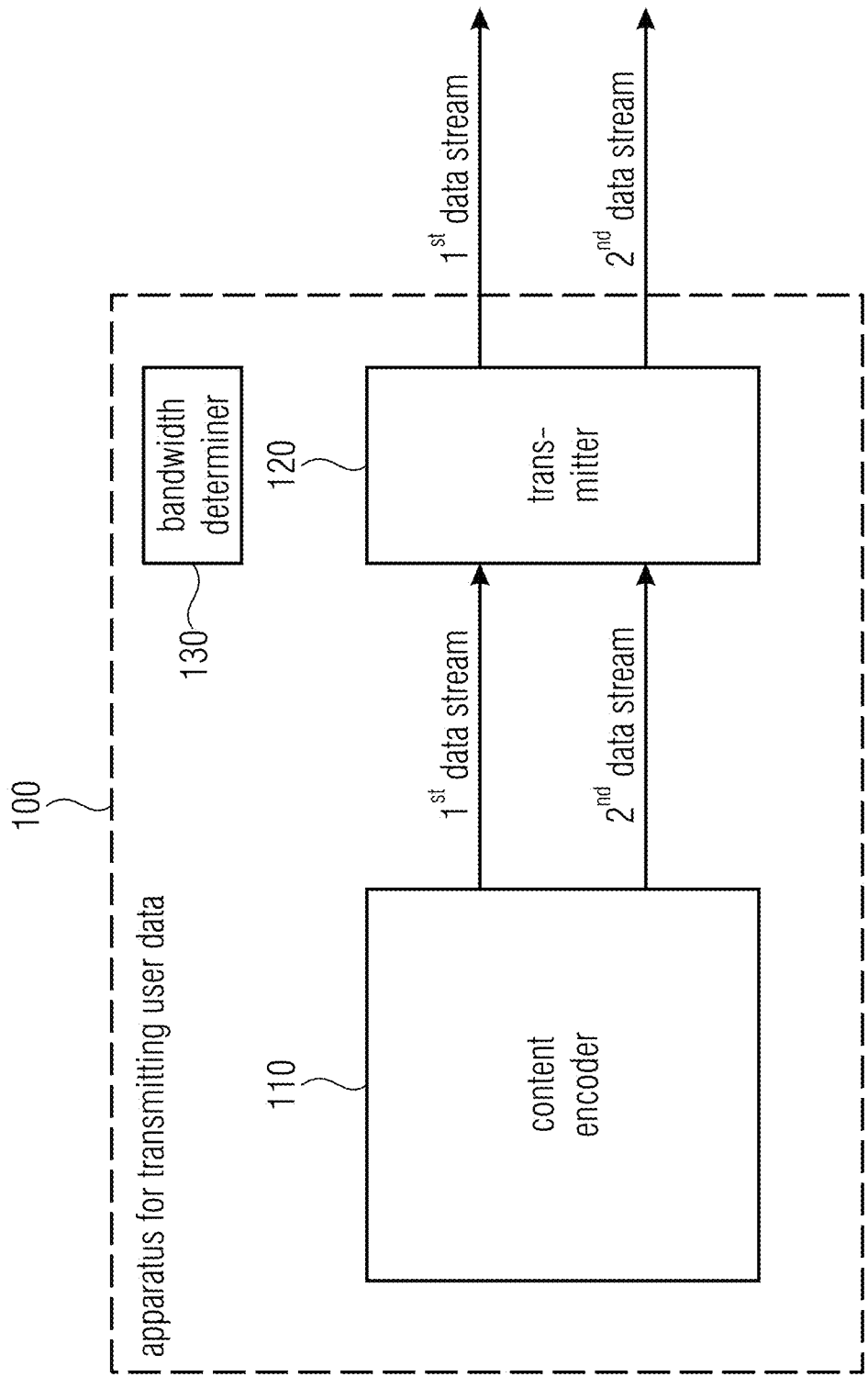
FIG. 4 illustrates an apparatus for transmitting user data according to another embodiment further comprising a bandwidth determiner.
Figure 5:
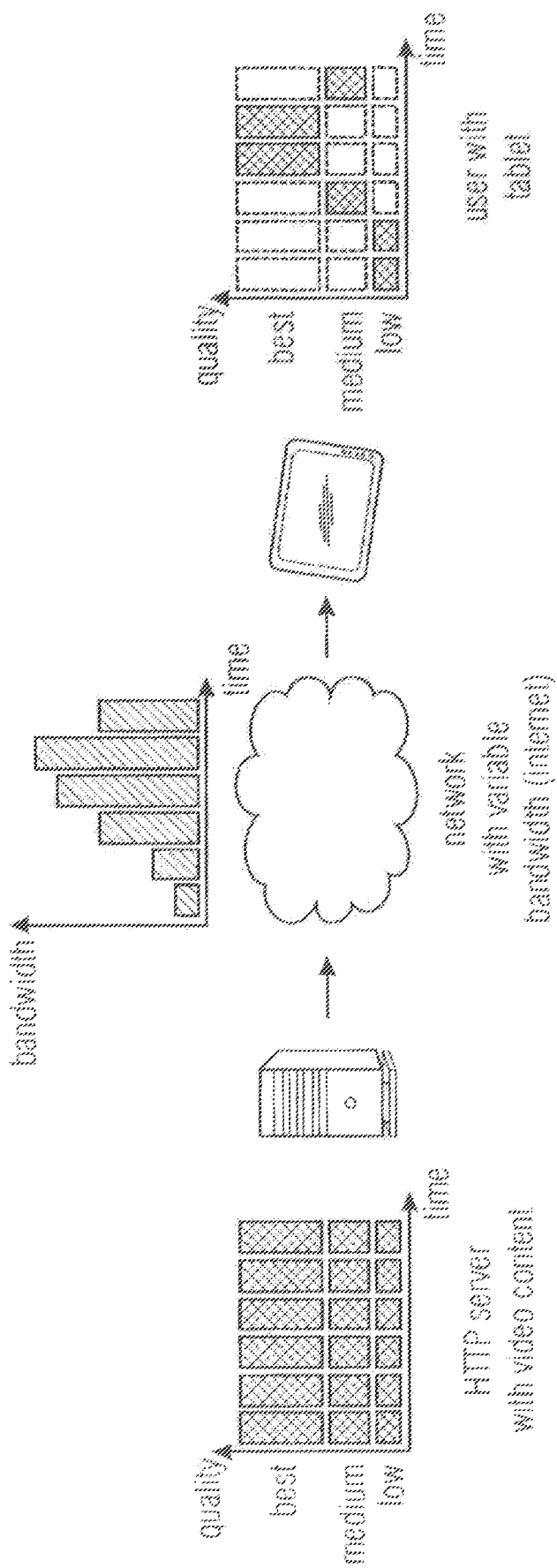
FIG. 5 depicts a DASH streaming scenario and the behavior of the client.

So, according to an embodiment illustrated by FIG. 4, the apparatus 100 may, e.g., further comprise a bandwidth determiner 130. Assume that the first data stream comprises a plurality of segments. The bandwidth determiner may, e.g., be configured to determine a determined quality as the bandwidth-dependent quality for encoding one of the plurality of portions of the user data depending on a transmission time for transmitting one or more of the segments from the apparatus to the server system. Then the content encoder 110 may, e.g., be configured to encode said one of the plurality of portions depending on the determined quality.

In an embodiment, the content encoder 110 may, e.g., be configured to encode all of the portions of the user data, which have been encoded within the first data stream with a bandwidth-dependent quality being lower than the predefined quality, within the second data stream with the predefined quality.

However, in an embodiment, the content encoder 110 may, e.g., be configured to not encode one or more of the portions of the user data, which have been encoded within the first data stream with a bandwidth-dependent quality being equal to the predefined quality, within the second data stream.

This feature of some embodiments of the present invention means, not all the portions of the user data are also encoded within the second data stream. Instead, portions that are already encoded with the predefined quality (e.g., the best quality) within the first data stream (e.g., a live data stream) do not have to be transmitted again to the server system 200, as they are then already available at the server system in best quality.

For example, the portions of the user data may be numbered, e.g., to identify portions of the user data within the first and the second data stream. For example, if in the second data stream the portions with the numbers 192, 193, and 195 arrive, then the server system 200 may look for the portion 194 in a memory of the server system, as this portion already arrived within the first data stream, for example, in the predefined (e.g., best) quality. E.g., for this purpose, the server system, e.g., the one of the servers of the server system may comprise such a memory.

So, in an embodiment, the content encoder 110 may, e.g., be configured to not encode any of the portions of the user data, which have been encoded within the first data stream with a bandwidth-dependent quality being equal to the predefined quality, within the second data stream.

In an embodiment, the user data may, e.g., be image data or video data, wherein the bandwidth-dependent quality may, e.g., depend on at least one of a first image resolution and a first image quantization, or may, e.g., depend on at least one of a first video resolution and a first video quantization, and wherein the predefined quality may, e.g., depend on at least one of a second image resolution and a second image quantization, or may, e.g., depend on at least one of a second video resolution and a second video quantization.

For example, it is well known in the art that images, e.g., JPEG images may, e.g., be compressed with a higher compression factor or with a lower compression factor. If the compression factor is higher, then the quality is lower, and vice versa. In most cases, a higher compression leads to a smaller number of bits that have to be transmitted, and so to a lower bandwidth demand, but also, in most cases, reduces the quality of the transmitted user data.

The same considerations regarding the degree of compression and the encoded quality is also applicable for video data and audio data.

So, according to an embodiment, the user data is audio data, wherein the bandwidth-dependent quality is indicated by a first compression factor, and wherein the predefined quality is indicated by a second compression factor.

In an embodiment, the apparatus 100 may, e.g., be a mobile device. For mobile devices, the concepts of the present invention are particularly useful, as, for example, mobile devices often communicate in networks with significantly limited available bandwidth.

According to an embodiment, the user data is a photo being recorded by a camera of the mobile device, or wherein the user data is a video being recorded by the camera of the mobile device, or wherein the user data is an audio recording being recorded by a microphone of the mobile device. For such embodiments, the concepts of the present invention are particularly useful, as videos involve a significant amount of bandwidth/data rate and as videos may be particularly suitable for being encoded in different qualities.

Now, transcoding is considered (for transcoding, see [6]). Transcoding, for example, to H.264/SVC (Scalable Video Coding) (see [7]) could definitely bring caching advantages, due to its layered architecture (see [8]). Some of the provided concepts are a combination of several baselayers, e.g., one base layer per device class and additional SNR scalability, with, for example, up to four layers, for each class.

According to an embodiment, a layered architecture is employed. In such an embodiment, the user data is organized in different quality layers. A first layer, which may, e.g., be referred to as a "base layer" provides the lowest quality. Moreover, one or more enhancement layers exist, which provide a scalable quality. For example, at first, the base layer of a portion of the user data is uploaded by the apparatus 100, e.g., to the server system 200. By this, the portion of the user data becomes available at the server system 200, but with a low quality. For example, later, a first enhancement layer is provided to the server system 200. The base layer of the portion of the user data, already received by the server system 200, and the first enhancement layer together allow to decode the portion of the user data in a higher quality. Moreover, a second enhancement layer may be transmitted by the transmitter 120 later to the server system 200, so that the base layer, the first enhancement layer and the second enhancement layer allow to decode the portion of the user data with an even higher quality than the quality obtained when decoding the base layer and the first enhancement layer alone.

In other embodiments, the base layer and, one or more enhancement layers of a portion of the user data may be transmitted encoded within the first data stream at the same time, and one or more further enhancement layers of the user data may be transmitted encoded within the second data stream.

Regarding differential encoding according to some embodiments, for example, the first enhancement layer provides additional information, for example, a kind of differential information, to decode the portion of the user data in a higher quality. For example, an image may be encoded with a low resolution by the base layer. To decode a higher quality, e.g., with a higher image resolution, intermediate pixels may be determined. Consider, for example, two neighboring pixels, wherein the first pixel has greyscale value 114, and the second pixel, being a neighbour of the first pixel has greyscale value 120. Then, an averaged intermediate pixel between both pixels has value (114+120)/2=117. Now, the first enhancement layer may indicate for this intermediate pixel by an encoded value "+2" that the value of this intermediate pixel is not 117, but instead 117+2=119. By employing such differential encoding, efficient encoding can be employed (as few bits are needed to encode the differential values) and an improved quality can be subsequently be transmitted.

In an embodiment, the number of enhancement layers of a portion of the user data that is transmitted within the first data stream depends on the bandwidth that is available for transmitting the first data stream from the apparatus 100 to the server system 200. This number may be determined by the content encoder 110.

In the above-embodiments the base layer and the enhancement layers may be referred to as quality layers. The quality layers together allow to decode the respective portion of the user data.

According to an embodiment, the content encoder 110 of the apparatus 100 is configured to encode each of the plurality of portions of the user data to obtain the first data stream by encoding each of the portions of the user data by encoding one or more quality layers of said portion of the user data within the first data stream. The bandwidth-dependent quality depends on a number of the quality layers being encoded within the first data stream. The content encoder 110 is configured to determine the number of the quality layers depending on the bandwidth that is available for transmitting the first data stream from the apparatus 100 to the server system 200. The content encoder 110 is configured to encode at least one of the plurality of portions of the user data to obtain the second data stream by encoding one or more further quality layers of said at least one of the plurality of portions of the user data.

Using the one or more quality layers of a portion of the user data being encoded within the first data stream, the server system 200 can decode the portion of the user data with the bandwidth-dependent quality.

Using the one or more quality layers of the portion of the user data being encoded within the first data stream, and one or more further quality layers of the portion of the user data being encoded within the second data stream, the server system 200 can decode the portion of the user data with the predefined quality, wherein the predefined quality is higher than the bandwidth-dependent quality, if the second data stream comprises at least one further quality layer of the portion of the user data.

Moreover, as already illustrated by FIG. 2, a server system 200 is provided. The server system 200 comprises one or more servers, in FIG. 2, a first server 210, and, optionally, a second server 220.

The server system 200 is configured to receive a first input data stream, wherein a plurality of portions of user data are encoded within the first input data stream, wherein each of the plurality of portions being encoded within the first input data stream has a portion-specific quality.

Furthermore, the server system 200 is configured to receive a second input data stream, wherein two or more of said plurality of portions of said user data are encoded within the second input data stream, wherein each of the plurality of portions being encoded within the second input data stream has a predefined quality, wherein the portion-specific quality of one or more of the portions being encoded within the first input data stream is lower than the predefined quality.

That the portions encoded within the first input data stream have a portion-specific quality means that the quality of the portions may differ from portion to portion. For example, the first input data stream and the second input data stream may have been generated by an apparatus 100. Regarding the first input data stream, the quality of each of the encoded portions may be bandwidth-dependent. As the available bandwidth may change over time, the quality of the encoded portions may also be adapted by the apparatus 100. As the quality of the encoded portions within the first input data stream may, but does not necessarily have to, change between subsequent portions, the quality can be considered as being portion-specific.

The one or more servers 210, 220 of the server system 200 are configured to generate one or more output data streams by processing at least one of the first input data stream and the second input data stream such that for each of the one or more output data streams, said plurality of portions of said user data are encoded within said output data stream with an output quality.

Moreover, the one or more servers 210, 220 of the server system 200 are configured to generate each of the one or more output data streams such that the output quality of said plurality of portions of said user data is lower than or equal to a requested quality.

That the output quality of said plurality of portions of said user data is lower than or equal to a requested quality means that the output quality should not be higher than requested, because, a higher output quality means that more bandwidth/a higher bitrate is used, e.g., if the output quality is higher than requested, then the bandwidth used/bitrate used might be higher than allowed.

In an embodiment, the output quality may, for example, be equal to the requested quality.

The requested quality may, for example, be requested by one of the consumer clients 310, 320.

In an embodiment, the output quality may, for example, also be lower than or equal to the predefined quality, as the predefined quality may, e.g., be the best quality provided by the apparatus 100.

In other words, in an embodiment, a maximum quality that is provided to a consumer client is the user data in the quality that is uploaded by the apparatus 100, e.g., a content-producing client. In case of the first input data stream (e.g., a live stream) this is the portion-specific quality, which may, e.g., depend on the bandwidth that was available for transmission. In case of the second input data stream (e.g., an on-demand stream) this is the predefined quality, e.g., the best quality.

In an embodiment, the one or more servers 210, 220 of the server system 200 may, e.g., be configured to generate at least one of the one or more output data streams by processing one or more of the portions of said user data being encoded with the predefined quality within the second input data stream and by processing one or more of the portion of said user data, which are not encoded within the second input data stream and which are encoded within the first input data stream.

For example, as explained above, only those portions of the user data may be encoded in the second (e.g., later) input data stream which have not been received with the predefined (e.g., best) quality in the first input data stream.

In an embodiment, the portions of the user data may be numbered, and the portions not transmitted in the second input data stream may be taken, e.g., from a memory of the server system 200, as they already arrived encoded within the first input data stream.

For example, only those portions are transmitted encoded within the second input data stream that have not been transmitted with the predefined quality (e.g., best quality), but with a lower quality within the first input data stream.

According to an embodiment, the one or more servers 210, 220 of the server system 200 may, e.g., be configured to generate the one or more output data streams if at least one client requests that one of the one or more output data streams shall be generated.

In an embodiment, the one or more servers 210, 220 of the server system 200 may, e.g., be configured to not generate any of the one or more output data streams, if no (consumer) client 310, 320 requests that any of the one or more output data streams shall be generated.

According to an embodiment, the one or more servers 210, 220 may, e.g., be configured to generate two or more output data streams, if a first (consumer) client 310 requests a first one of the two or more output data streams with said plurality of portions of user data being encoded with a first quality, and if a second (consumer) client 320 requests a second one of the two or more output data streams with said plurality of portions of user data being encoded with a second quality, said second quality being different from the first quality.

Regarding the above-described quality layers, according to an embodiment, the server system 200 may, e.g., be configured to receive the first input data stream, wherein said plurality of portions of the user data are encoded within the first input data stream as one or more quality layers of each of said plurality of portions of the user data. The one or more servers 210, 220 of the server system 200 may, e.g., be configured to obtain said plurality of portions with the portion-specific quality by processing the one or more quality layers of each of the plurality of portions of the user data being encoded within the first input data stream. The server system 200 may, e.g., be configured to receive the second input data stream, wherein said two or more of said plurality of portions of the user data are encoded within the second input data stream as one or more further quality layers of each of said two or more of said plurality of portions of the user data. The one or more servers 210, 220 of the server system 200 may, e.g., be configured to obtain said two or more of said plurality of portions of the user data with the predefined quality depending on the one or more quality layers of said two or more of said plurality of portions of the user data being encoded within the first input data stream and depending on the one or more further quality layers of said two or more of said plurality of portions of the user data being encoded within the second input data stream.

Moreover, a system, as illustrated by FIG. 3 is provided. The system comprises at least one apparatus 100 according to one of the above-described embodiments, and a server system 200 according to one of the above-described embodiments. Each of the at least one apparatus 100 is configured to transmit a first input data stream and a second input data stream to the server system 200.

In a particular embodiment, such a system may, e.g., further comprise one or more consumer clients 310, 320. Each of the one or more consumer clients 310, 320 may, e.g., be configured to request an output data stream from the server system 200. The server system 200 may, e.g., be configured to generate the output data stream, being requested by one of the one or more consumer clients 310, 320, from at least one of the first input data stream and the second input data stream, and to provide the output data stream to said one of the one or more consumer clients 310, 320.

In the following, CLOUD-assisted DASH (Dynamic Adaptive Streaming over HTTP) is considered. The inventive cloud concepts (server system concepts) can assist Dynamic Adaptive Streaming over HTTP (DASH).

In particular, the content generation, which comprises the creation of multiple versions, e.g., with different resolution, bitrate, codec etc. of the content is described. Furthermore, these content creation, may, in some embodiments, for example, be offloaded to the cloud, which will be described in the following. Later on, the architecture of a cloud based DASH streaming system and its utilization for content consumption and transcoding is described.

In the following, content generation is described.

Offloading the major parts of the DASH content generation to the cloud (e.g., a server system, as described above), especially for mobile devices with limited storage and hardware capabilities. Some techniques that could support that process are proposed in this section.

Simoens et. al. [5] has described that the major challenges for remote display solutions for mobile cloud computing are the varying bandwidth conditions, the battery lifetime and the interaction latency.

Regarding video streaming, no interaction is necessary, and there is consequently no interaction latency challenge. However, the varying bandwidth conditions and the requirement to be gentle to the battery are still hard problems.

An approach could be to handle the bandwidth fluctuations of networks, which are based on the Internet Protocol (IP) with DASH, as described above.

Furthermore, DASH is also gentler to the battery, compared to progressive download or P2P streaming, due to its chunk based streaming architecture, as shown by Liu et. al (see [4]). This energy efficiency is based on the WiFi usage pattern that DASH produces. Liu et al. (see [4]) has shown that chunk based streaming approaches are consuming the WiFi device in a burst manner This means that there are periods where the WiFi will be fully utilized for transferring and between these periods there are pauses where the WIFI can be put into sleep mode by the hardware scheduler. The usage pattern is much more energy efficient than progressive download or P2P usage patterns where the WiFi will be used without pauses but not with fully transferring or receiving bandwidth. Especially, Apple® which has a foible for energy efficiency and battery lifetime has equipped their dynamic HTTP streaming solution, i.e., Apple® HTTP Live Streaming (see [15]) with a very large buffer and an adaptation logic that supports this usage pattern (see [17]). Additionally, Simoens et. al. (see [5]) has also described that such a sleep/send pattern increases the battery lifetime due to the more efficient WiFi usage.

Since DASH could handle the two major requirements e.g. varying bandwidth and energy efficiency, it seems to be a good streaming approach for such scenarios. Nevertheless, due to the limited hardware capabilities of mobile devices it is not always possible to generate multiple versions of the content, which is needed by the consumers of the DASH stream. Therefore, offloading the content generation process to a cloud may be used and should increase the battery lifetime of mobile devices.

The following subsections are focusing on these facts and describe the live and on-demand content generation. For example, the first (input) data stream referred to above may, e.g., be provided by the apparatus 100 for generating live streams for consumer clients 310, 320, and the second (input) data stream referred to above, may, e.g., be provided by the apparatus 100 for generating on demand content for the consumer clients 310, 320.

At first, live content generation is considered. As an exemplifying embodiment, live DASH content generation and potential ways how the cloud could assist such a streaming system are described. The major requirements for the live streaming case are that the video be delivered in-time to the cloud (e.g., the server system 200) and that other users can consume this video in an adaptive manner from the cloud. Considering the mobile use case, with tremendous bandwidth fluctuations, it is really a challenge to transfer the video in-time to the cloud (e.g., the server system 200). Additionally, another sub requirement is that the streaming approach should be gentle to the battery.

In an embodiment, an implementation is based on DASH.

According to an embodiment, for example, the content generation, is driven by the cloud and, for example, the content distribution is driven by the consumers of the stream (e.g., consumer clients 310, 320).

Such an approach has several advantages, for example, that the cloud (e.g., server system 200) may, e.g., act like a centralized streaming coordinator. The upper bound of the quality may, e.g., be constrained by the bandwidth of the content generation device but this quality could be transcoded on the fly in the cloud. (regarding transcoding on the fly, see, for example, [6]).

Offloading a major part of the content generation process to the cloud, e.g., the server system 200, helps to increase the battery lifetime of mobile devices. Another advantage is that the cloud knows the clients are connected to the stream. This means that it knows the capabilities and bandwidth conditions of the users, due to their segment request pattern.

Therefore, the cloud acts like a smart streaming coordinator that requests the segment from the mobile content generation device, which comprises the major requirements, e.g., maximum requested resolution, bitrate, etc. that are needed to generate the individual segments for the consumers of the stream. This means that the cloud, e.g., the server system 200, may, e.g., transcode the requested segment on the fly for the users of the stream, but this should be less challenging due to the fact that this process could be easily parallelized as a consequence that the individual transcoding processes do not depend on each other, e.g., one core, machine or thread per user segment transcoding as depicted in FIG. 6.

Figure 6:
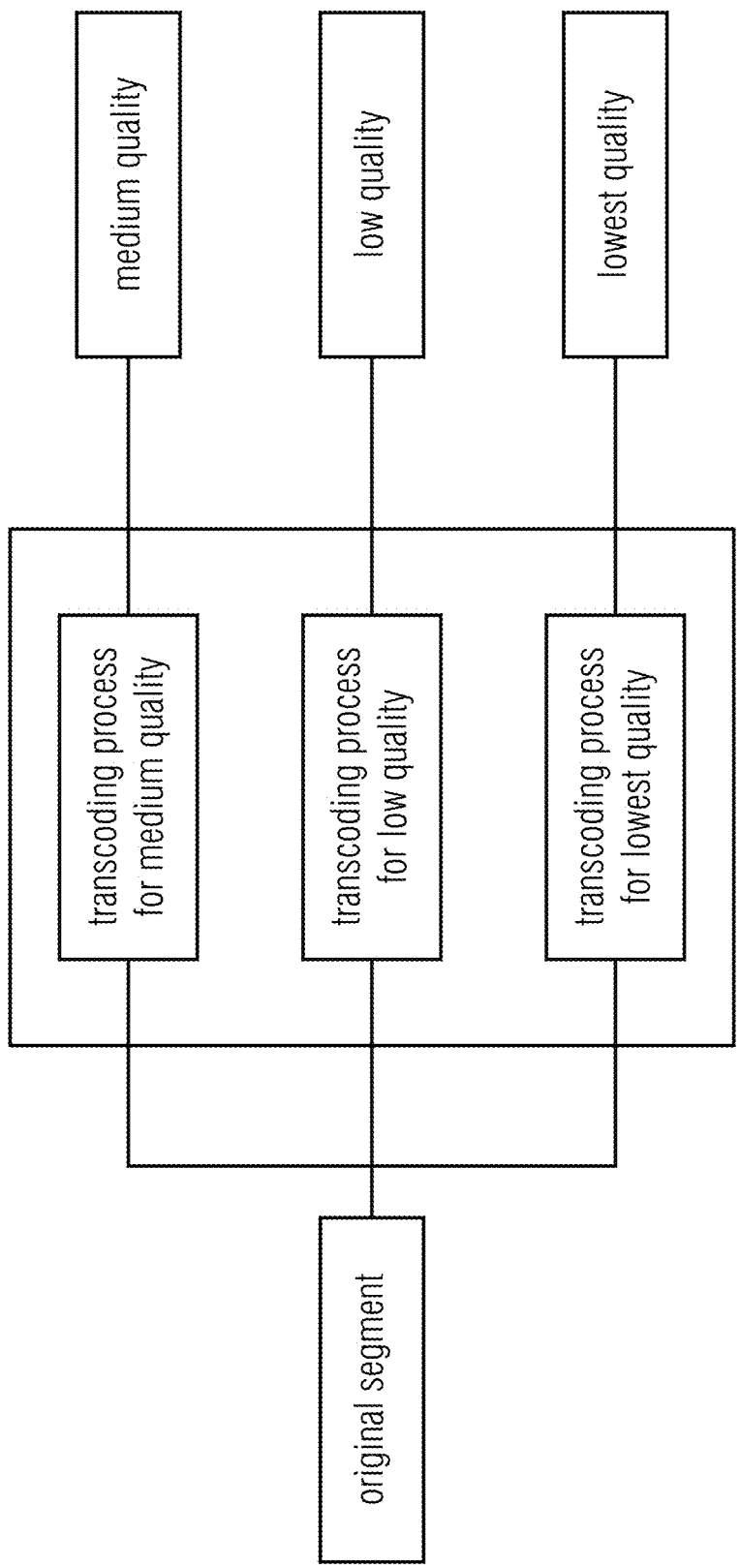
FIG. 6 illustrates On-The-Fly AVC Transcoding according to an embodiment.

In FIG. 6, On-The-Fly AVC Transcoding according to an embodiment is illustrated.

The above-described concepts have several advantages, especially for the mobile device, which acts solely as the content creator. This device has to produce only one segment per timepoint, which immensely decreases the computation complexity and therefore increases the battery lifetime. Another advantage of this approach is that if nobody consumes the stream the cloud would not request any segments. Therefore, no bandwidth or battery is wasted due to unnecessary WiFi load. A constant delay is added, due to the fact that the segment generation process could only be started, after the request from the cloud has arrived at the device, which generates the content. An additional delay will be added due the content generation that could only be started after that request. Nevertheless, this delay should be rather short and, as a consequence, most mobile devices have already one video encoding unit built in hardware.

In the following, the on-demand case (not-live) is considered. On-demand with cloud assisted DASH content generation has obviously lower and different requirements than the live use case. This use case is not time constrained, which means that the multimedia data could be uploaded when enough bandwidth is available.

Generally, the major requirements are that the video will be uploaded in the best quality with less energy consumption. This implies that the WiFi device be used in a burst manner with maximal transferring bandwidth as shown in [4]. Therefore, the streaming should be driven by the client device, because it knows the current usage of the WiFi device and its battery status best.

For example it would be a good idea to transfer parts of the video to the cloud when another application e.g. webbrowser, twitterapp, facebookapp etc. are already using the WiFi without utilizing the maximal available bandwidth. Additionally, it will probably be clever to upload the video when the device is connected through a broadband connection with the internet, which will decrease the upload time and therefore the WiFi device usage.

Immediately after the video has been fully uploaded to the cloud, e.g., the server system 200, it could be transcoded to a different bitrate, resolution or codec version and segmented and packaged for DASH streaming. The offloading of this task from the mobile device to the cloud and the clever uploading of the video should increase the battery lifetime of the mobile device. Moreover, a high quality video will be provided through the cloud that could be consumed on-demand by other users in an adaptive way.

In the following, general aspects of content consumption is considered. Regarding content consumption, state-of-the-art concepts may be employed together with the inventive embodiments of the present invention.

For example, according to an embodiment, cloud assisted content consumption for DASH streaming is realized. Generally, the uploaded video stream may, for example, be transcoded to H.264/SVC [7] and delivered with Peer Assisted Dynamic Adaptive Streaming over HTTP (PA-DASH) to the users of the stream. (For PADASH, see [10]).

Moreover, the Cloud provider infrastructure from Amazon® EC2, Windows® Azure or Google® App Engine etc. could be used to enhance the content distribution process, which means that server peers will be strategically placed in datacenters of the major continents as described by Cervino et. al. in [11]. There, this approach has been evaluated, and it has been shown that it should increase the streaming performance compared to traditional P2P and cloud streaming services. Huang et. al. [12] have also shown that the strategic placing of cache servers in the networks of the major Internet Service Providers (ISP) cloud increase the streaming performance and therefore the Quality of Experience (QoE) at the user device. Furthermore, Jin et. al. [9] has proposed a streaming architecture where the cloud assists the users for content discovery or in case of PADASH the cloud could dispatch a user, due to the known performances and device capabilities, to a server that serves also other users of this device class, e.g., resolution, bitrate. Codec, language etc. This would increase the caching, efficiency and automatically produce a kind of overlay where clients with similar preferences and capabilities get clustered Lederer et. al. [10] implies that such a clustering would tremendously improve the P2P efficiency of PADASH.

Furthermore, due to the usage of a layered compression system, e.g., H.264/SVC it is possible to achieve a higher segment reuse among these peers. Sanchez et. al. [8] has already shown that DASH, in combination with H.264/SVC, could improve the caching efficiency. However, it is not possible to provide only one base layer with a low resolution e.g. Common Intermediate Format (CIF) and scalable layers up to High Definition (HD), due to the fact that such a configuration would have too much prediction overhead which will immensely decrease the PSNR compared to H.264/AV [18]. Instead of having one base layer per device class, e g. resolution, and up to four SNR layers for each of these classes, it should achieve a higher caching efficiency with an acceptable PSNR [8].

In the following, multimedia sharing according to an embodiment is considered. Multimedia sharing from mobile devices is still a challenge in video streaming, due to the limited upload capacity and the varying bandwidth conditions of mobile network. A typical use case of media sharing is, e.g., that a user enables the camera of his or her mobile device and wants to share the recorded video immediately with his friends. Additionally, it should be possible, that the friends of this user could collaboratively enjoy and contribute to this streaming experience. This means that users who joined the stream could enable their own mobile camera or webcam and comment the shared event, which will result in a stream that comprises all this sub-videos.

Gadea et al [19] has deployed a cloud-based collaborative multimedia sharing system called Watch Together. Their results have shown that 24% of their users enabled their webcam and contributed actively to the shared stream, which is an indicator that the users enjoy this sharing experience. However, they have not considered the varying bandwidth conditions or energy efficiency for mobile devices, which is a major use case for multimedia sharing. Their main focus was the synchronization and scalability of the system, to enable deployment inside of a cloud. As already mentioned, Simoens et al. [5] has described the major challenges for remote display solutions for mobile cloud computing are varying wireless channel conditions, short battery lifetime and interaction latency pose. These: three challenges are also important for the multimedia sharing use case on mobile devices. However, as described above, Dynamic Adaptive Streaming over HTTP (DASH) handles such challenges.

According to embodiments, considering these facts the proposed cloud-assisted content generation on the mobile device consists of two encoding chains. One of these encoding chains will be used to produce a high quality on-demand version of the content and the other one will be used for the live multimedia sharing case.

According to an embodiment, the second encoding chain produces the best quality of the video with H.264/AVC (for H.264/AVC, see [18]). This video will be transferred to the cloud when bandwidth is available, maybe after the live event has ended. Furthermore, the video should be uploaded with less energy consumption as described above. This video is needed as a consequence that the best quality of the video should be available in the cloud so that the user or other users can consume this video afterwards. Moreover, the video may, e.g., be transcoded to H.264/SVC (for H.264/SVC, see [7]), segmented and packaged for DASH, so that the users can consume the video in an adaptive way.

Besides that, it should also be distributed in the cloud as described above, to maximize the streaming performance and increase the Quality of Experience (QoE) at the client devices.

In some embodiments, the first encoding chain may, e.g., be used for the live streaming of the content and produces variable bitrate segments on-demand due to the requests of the cloud as described above. The cloud, e.g., the server system 200, acts as the streaming coordinator and could request the segment from the mobile producer device that fulfills the major requirements so that it could be transcoded for the consumers of the stream.

Additionally, the cloud should also produce the joint stream that will be generated out of the video from the multimedia sharing device and the users that contribute to the video, with comments or their own stream. This video will then be transcoded to H.264/SVC and prepared for DASH streaming, which means that it will be distributed in the cloud, e.g., the server system 200.

Figure 7:
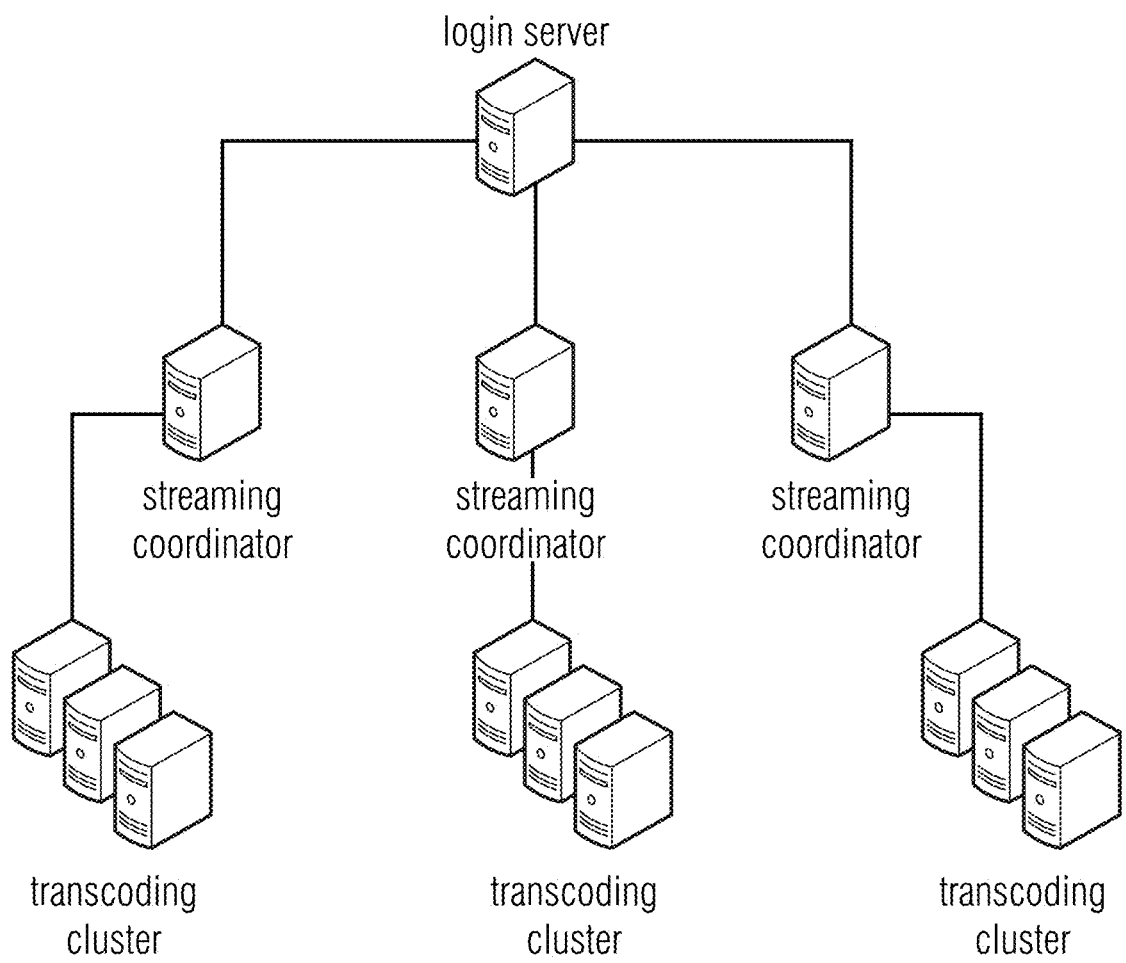
FIG. 7 illustrates a multimedia sharing architecture.

According to an embodiment, all users that contribute to the stream may, e.g., first login to the cloud service, as described by Gadea et. al. (for the cloud service of Gadea, see [19]) to achieve such a multimedia experience. After that login they will be forwarded to a handler server, which manages the streaming session and distributes the load of the transcoding in the cloud as depicted in FIG. 7, wherein FIG. 7 illustrates a multimedia sharing architecture. The session management will then be handled by the streaming coordinator that further distributes the transcoding processes in the cloud.

In some embodiments, adaptive streaming Dynamic Adaptive Streaming over HTTP (DASH) and cloud based services are combined. In particular embodiments, such a concept of combining Dynamic Adaptive Streaming over HTTP (DASH), and cloud based services may be employed for mobile devices.

Additionally, cloud based DASH content generation and consumption has been described. The DASH content generation is a very intense process that needs a lot of resources and power. Offloading this task to the cloud is especially important for mobile devices and, due to a clever upload bandwidth utilization and chunk based uploading, an energy efficient content generation process has been described.

Furthermore, concepts for live content generation and on-demand content generation have been provided, which have different requirements. For example the proposed technique for live content generation is driven by the cloud that acts as the streaming coordinator. In addition to this, the on-demand content generation is driven by the client, due to the fact that the client knows the current load of the WiFi device and the connection best, which are important requirements to achieve an energy efficient uploading process. Besides that, the DASH content consumption with cloud assistance has also been described. The major findings are that transcoding to H.264/SVC and Peer assisted DASH outsources some load to the surrounding networks of the cloud and that cloud architectures could support the streaming very well.

Moreover, a combination the above-described embodiments, and the architectures of Cervino et. al. [11] and Huang et. al. [12] has been described which increases the streaming performance due to the strategic placing of server nodes in the datacenters of the major continents and utilizes the interconnection of these datacenters for content distribution. In addition to this, proxy caches with a Least Frequently Used (LFU) replacement strategy should be placed in the networks of the major Internet Service Providers (ISP) to increase the streaming performance as proposed by Huang et. al. in [12].

Additionally, multimedia sharing embodiments have been described. Such embodiments combine the content generation and consumption. The cloud acts as streaming coordinator and producer of the joint stream. In embodiments, cloud assisted DASH further improve the system from Gadea et. al. [19] so that even mobile devices can contribute to the streaming experience.

Embodiments employ Dynamic Adaptive Streaming over HTTP. Some embodiments employ Cloud Assisted Adaptive Streaming, which comprises content generation and content consumption Some embodiments provide real time capabilities. Real-time entertainment is accounting for more than 50% of the whole internet traffic. HTTP is the major protocol and used for a variety of services. Regarding real-time entertainment, mobile applications become increasingly important as a Post-PC era has already been entered even for fixed access networks. Important application fields are gaming, secure tunneling, social networking, real-time communications, bulk entertainment, P2P filesharing, web browsing and real-time entertainment.

Mobile networks differ significantly from fixed access networks. In this context, real-time entertainment is accounting for approx. 30% and HTTP is still the major protocol employed. Regarding mobile network traffic, upstream multimedia traffic seems to be a problem.

In embodiments, dynamic adaptive streaming over HTTP is employed. A flexible and scalable deployment is realized. Dynamic adaptation to network conditions becomes possible. Moreover, reusing of existing Internet infrastructure. In embodiment, the logic is located at the client side.

As described above, embodiments realize cloud-assisted adaptive streaming. By employing the inventive concepts of the presents invention, major challenges for mobile cloud computing (see [5] for these major challenges), can be overcome. Major challenges for mobile computing are varying bandwidth conditions, battery lifetime and interaction latency. Adaptive streaming solution, in particular Dynamic Adaptive Streaming over HTTP (DASH) could handle the varying bandwidth but it is computation intensive, storage intensive and not gentle to the battery.

Figure 8:
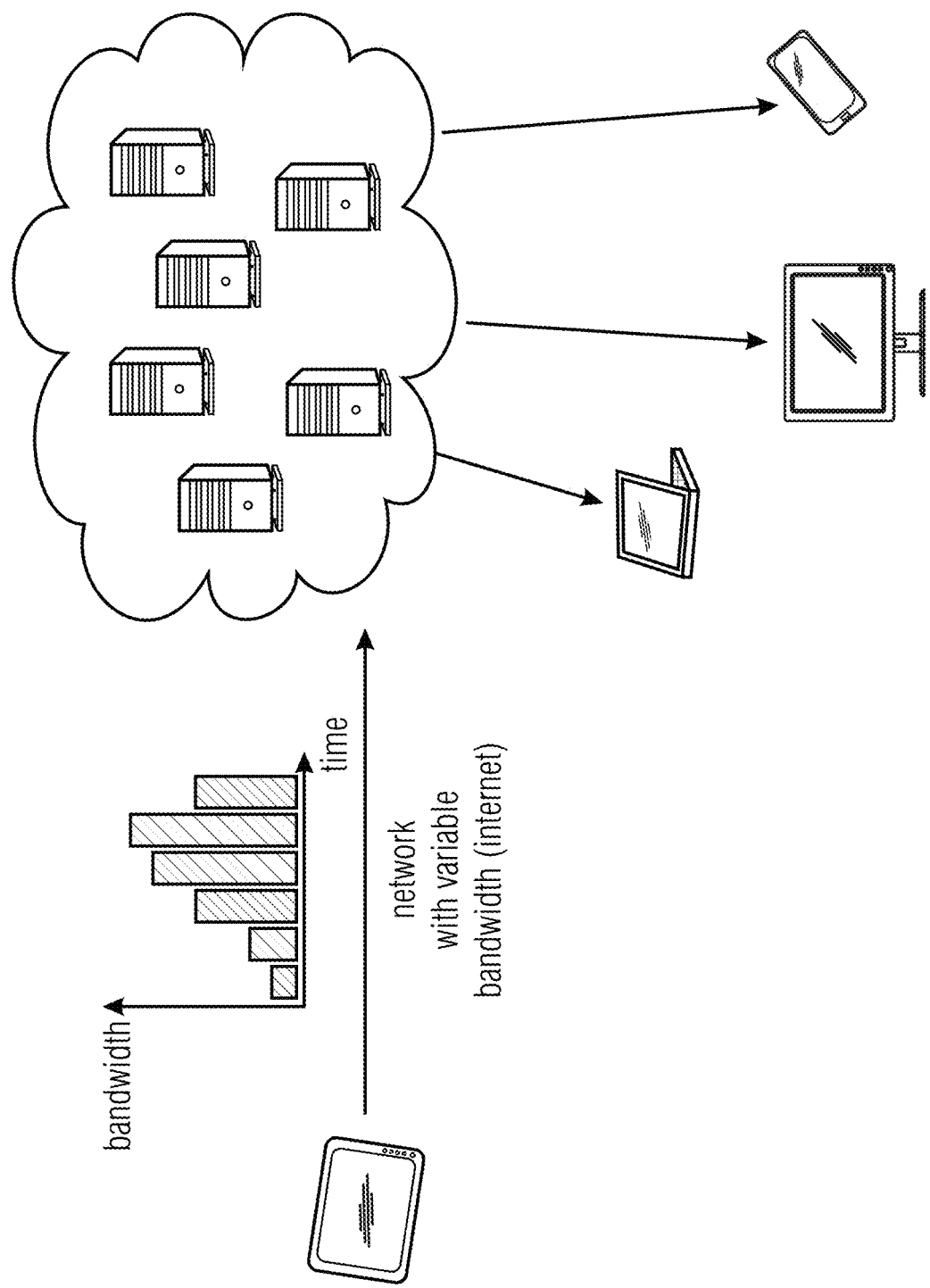
FIG. 8 illustrates a cloud-assisted adaptive streaming architecture according to an embodiment.
Figure 9:
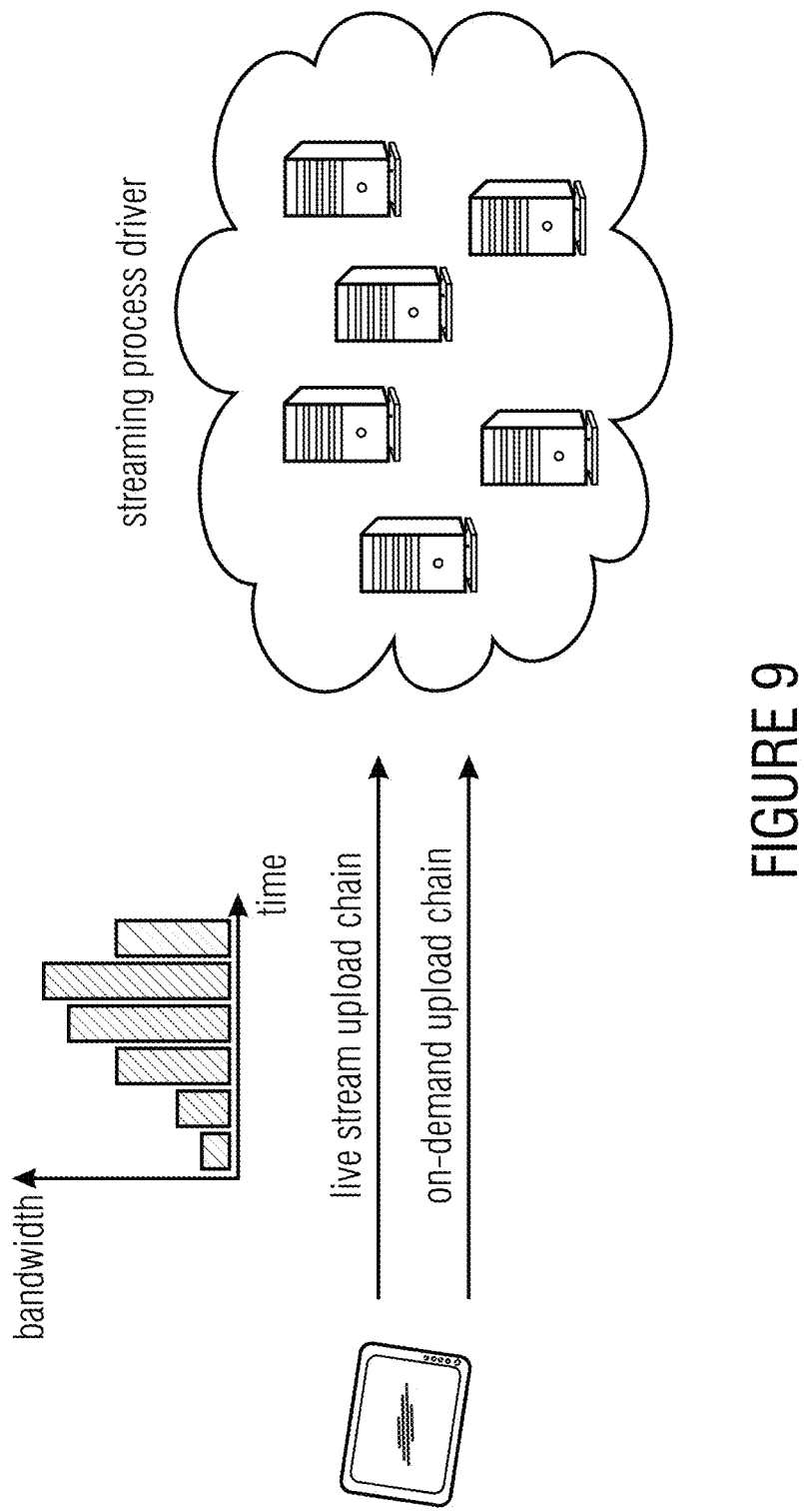
FIG. 9 illustrates two encoding processes at the content generation device according to an embodiment.

A cloud-assisted adaptive streaming architecture according to an embodiment is illustrated in FIG. 8. In such an embodiment, in time live streaming and a predefined quality, e.g., a best quality, for on-demand streaming is realized. Various devices, different capabilities, a varying bandwidth, and different codecs and resolutions are handled. For this purpose, as illustrated in FIG. 9, embodiments employ two encoding processes at the content generation device: a live stream chain and an on-demand streaming chain.

Regarding the live streaming chain, the cloud, e.g., the server system 200, acts as centralized streaming coordinator/driver. It knows the capabilities of the consumer devices 310, 320. For example, in an embodiment, a download of only one segment per time point from the consumer device may, for example, be allowed. A segment may, e.g., comprise the maximum requirements. In embodiments, transcoding in the cloud for multiple clients may, e.g., be implemented.

This may, e.g., realize a reduced computation complexity at the content generation device, a low latency compared to non-cloud assisted adaptive streaming, less power consumption compared to non-cloud assisted adaptive streaming and/or effective usage of the available bandwidth. Moreover, multiple clients with different capabilities can be served.

Regarding the on-demand streaming chain, the content producer acts as streaming driver. The second encoding chain produces a video with best quality. In an embodiment, the user data, e.g., the video will be chunk based uploaded when bandwidth is available, and/or when other processes are already consuming the WiFi device, and/or when the device is connected through a broadband connection.

Figure 10:
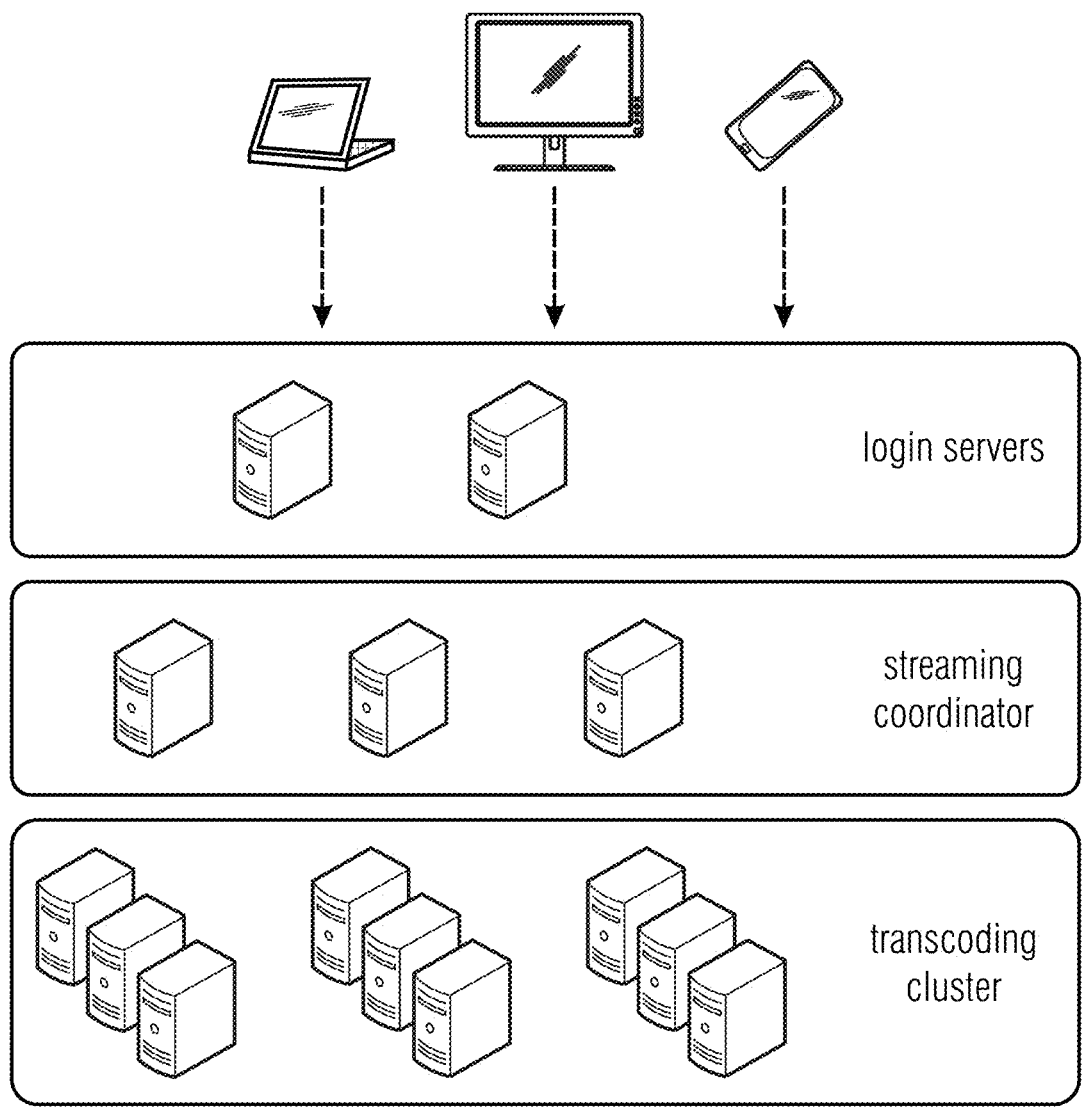
FIG. 10 illustrates content consumption and stream coordination according to an embodiment.

FIG. 10 illustrates content consumption and stream coordination according to an embodiment. The login servers illustrated in FIG. 10 may, e.g., forward the clients to the corresponding stream coordinator. This may, e.g., be helpful for an optimal segment selection. Multiple transcoding clusters may, e.g., exist for each stream.

Figure 11:
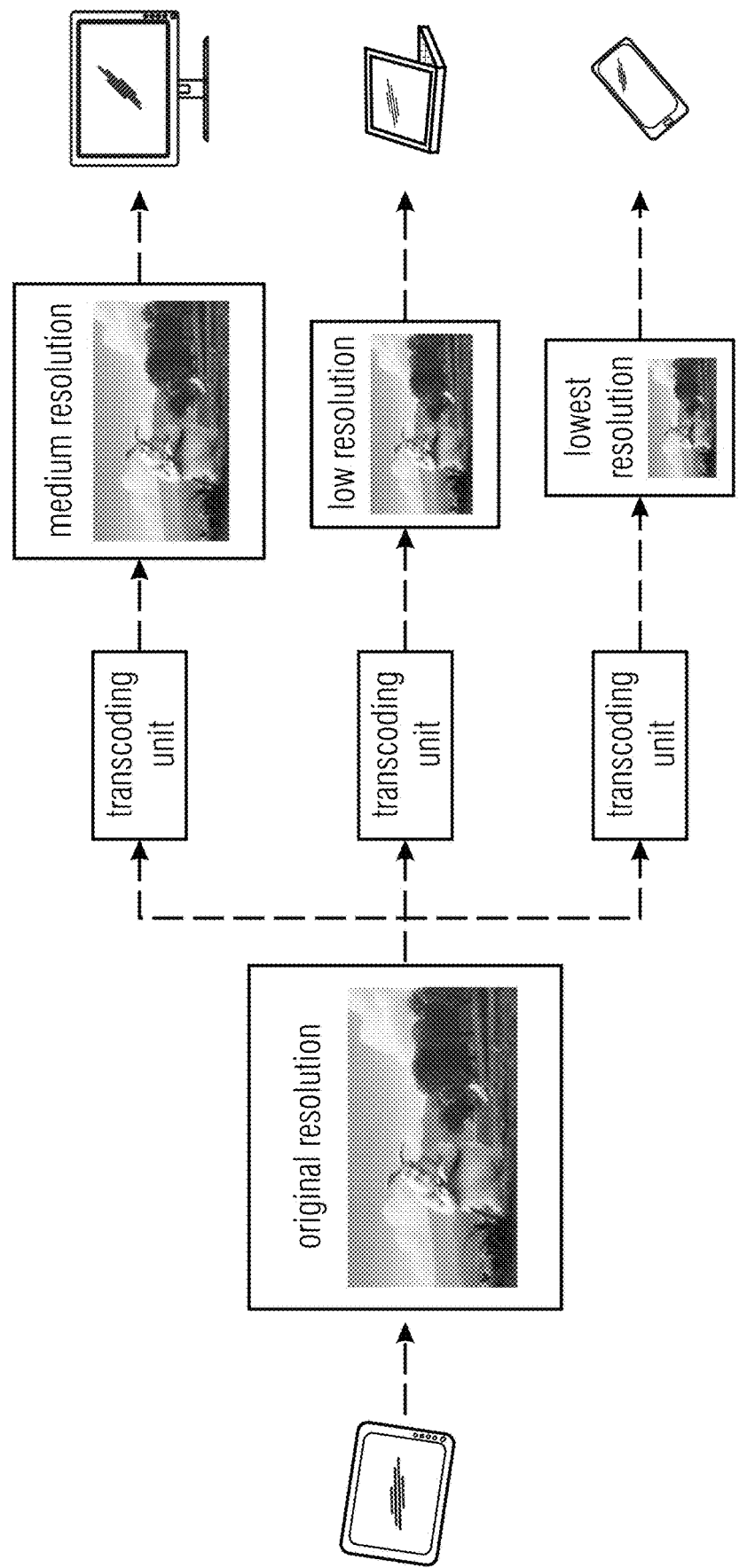
FIG. 11 illustrates content consumption and transcoding according to an embodiment.

FIG. 11 illustrates content consumption and transcoding according to an embodiment. The cloud, e.g., the server system 200, may, e.g., select the segment that comprises the maximal requirement. Transcoding processes may, for example, not depend on each other. This allows easy parallelization per thread, and/or per core, and/or per machine.

As has been described above, cloud-assisted adaptive streaming and cloud-assisted DASH according to embodiments has been provided to enhance the multimedia sharing experience. Two encoding chains for live and on-demand may, for example, exist. The cloud, e.g, the server system, may act as an intelligent streaming coordinator for live streaming Embodiments realize a more effective usage of the bottleneck bandwidth between the cloud and the mobile content producer, varying bandwidths are handled and/or computation complexity is offloaded to the cloud. The provided embodiments are gentle to the battery and it has been found that transcoding processes scale very well in the cloud.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] P. Ni, R. Eg, A. Eichhorn, C. Griwodz, P. Halvorsen, "Spatial Flicker Effect in Video Scaling", In *Proceedings of the third international Workshop an Quality of Multimedia Experience (QOMEX'11)*, Mechelen, Belgium, September 2011, pp. 55-60.

[2] T. Stockhammer, "Dynamic Adaptive Streaming over HTTP—Standards and Design Principles", In *Proceedings of the ACM Multimedia Systems (MMSys11)*, San Jose, Calif., USA, February 2011, pp. 133-143.

[3] ISO/IEC DIS 23001-6. 2011, Information technology—MPEG systems technologies—Part 6: Dynamic adaptive streaming over HTTP (DASH).

[4] Y. Liu, "Towards Efficient Resource Utilization in Internet Mobile Streaming", In *Proceedings of the ACM Multimedia 2011 (MM11)*, Scottsdale, Ariz., USA, Nov. 28, 2011.

[5] P. Simoens, F. D. Turck, B. Dhoedt, P. Demeester, "Remote Display Solutions for Mobile Cloud Computing", *IEEE Computer*, 2011.

[6] Z. Huang, C. Mei, L. E. Li, T. Woo, "CloudStream: delivering high-quality streaming videos through a cloud-based SVC proxy", In *Proceedings of the IEEE INFOCOM*, 2011.

[7] H. Schwarz, D. Marpe, T. Wiegand, "Overview of the Scalable Video Coding Extensions of the H.264/AVC Standard," In *Proceedings of the IEEE Transactions on Circuits and Systems for Video Technology*, September 2007.

[8] Y. Sanchez, T. Schierl, C. Hellge, T. Wiegand, D. Hong, D. D. Vleeschauwer, W. V. Leekwijck, Y. L. Leuedec, "iDASH: Improved Dynamic Adaptive Streaming over HTTP using Scalable Video Coding," In *Proceedings of the ACM Multimedia Systems 2011 (MMSys11)*, San Jose, Calif., February 2011.

[9] X. Jin, Y. K. Kwok, "Cloud Assisted P2P Media Streaming for Bandwidth Constrained Mobile Subscribers", In *Proceedings of the 16$^{th}$ International Conference on Parallel and Distributed Systems*, Shanghai, China, 2010.

[10] S. Lederer, C. Müller, C. Timmerer, "Peer-Assisted Dynamic Adaptive Streaming over HTTP—System Design and Evaluation", In *Proceedings of the IEEE International Packet Video Workshop 2012 (PV12)*, Munich, Germany, May 10-11, 2012.

[11] J. Cervino, P. Rodriguez, I. Trajkovska, A. Mozo, J. Salvachua, "Testing a Cloud Provider Network for Hybrid P2P and Cloud Streaming Architectures", In *Proceedings of the 4$^{th}$ IEEE International Conference on Cloud Computing*, Washington, USA, 2011.

[12] Y. Huang, Z. Li, G. Liu, Y. Dai, "Cloud Download: Using Cloud Utilities to Achieve High-Quality Content Distribution for Unpopular Videos", In *Proceedings of the ACM Multimedia 2011 (MM11)*, Scottsdale, Ariz., USA, Nov. 28, 2011.

[13] B. Wang, J. Kurose, P. Shenoy, D. Towsley, "Multimedia Streaming via TCP: An Analytic Performance Study", In *Proceedings of the ACM Transactions on Multimedia Computing, Communication and Applications*, Vol. 4, No. 2, May 2008, pp. 16:1-16:22.

[14] A. Zambelli, "IIS Smooth Streaming Technical Overview," *Technical Report,* Microsoft Corporation, March 2009.

[15] R. Pantos, W. May, "HTTP Live Streaming", IETF draft, http://tools.ietf.org/html/draft-pantos-http-live-streaming-07 (last access: March, 2012).

[16] Adobe HTTP Dynamic Streaming, http://www.adobe.com/products/httpdynamicstreaming/(last access: March, 2012).

[17] C. Müller, S. Lederer, C. Timmerer, "An Evaluation of Dynamic Adaptive Streaming over HTTP in Vehicular Environments," In *Proceedings of the 4th Workshop on Mobile Video (MoVid12) and the ACM Multimedia Systems Conference* 2012 (*MMSys*12), Chapel Hill, N.C., USA, February 2012.

[18] T. Wiegand, G. J. Sullivan, G. Bjontegaard, A. Luthra, "Overview of the H.264/AVC Video Coding Standard," In *Proceedings of the IEEE Transactions on Circuits and Systems for Video Technology*, July, 2003.

[19] C. Gadea, B. Solomon, B. Ionescu, D. Ionescu, "A Collaborative Cloud-Based Multimedia Sharing Platform for Social Networking Environments", In *Proceedings of the Computer Communications and Networks Conference (ICCCN)*, Maui, Hi., July, 2011.

The invention claimed is:

1. An apparatus for transmitting user data to a server system comprising one or more servers, wherein the apparatus comprises:

a content encoder for encoding a plurality of portions of the user data to acquire a first data stream, wherein the content encoder is configured to encode each of the plurality of portions of the user data with a bandwidth-dependent quality which depends on a bandwidth that is available for transmitting the first data stream from the apparatus to the server system, and a transmitter for transmitting the first data stream from the apparatus to the server system, wherein the content encoder is configured to encode two or more of the plurality of portions of the user data to acquire a second data stream, wherein the content encoder is configured to encode each of the two or more of the plurality of portions of the user data with a predefined quality, wherein the bandwidth-dependent quality of one or more of the plurality of portions of the user data being encoded within the first data stream is lower than the predefined quality, and wherein the transmitter is configured to transmit the second data stream from the apparatus to the server system, wherein the content encoder is configured to encode each of the plurality of portions of the user data to acquire the first data stream by encoding each portion of the plurality of portions of the user data by encoding one or more quality layers of said one of the plurality of portions of the user data within the first data stream, wherein the bandwidth-dependent quality depends on a number of the quality layers being encoded within the first data stream, wherein the content encoder is configured to determine the number of the quality layers, being encoded within the first data stream, depending on the bandwidth that is available for transmitting the first data stream from the apparatus to the server system, and wherein the content encoder is configured to encode at least one of the plurality of portions of the user data to acquire the second data stream by encoding one or more further quality layers of said at least one of the plurality of portions of the user data.

2. The apparatus according to claim 1, wherein the content encoder is configured to encode all of the plurality of portions of the user data, which have been encoded within the first data stream with a bandwidth-dependent quality being lower than the predefined quality, within the second data stream with the predefined quality.

3. The apparatus according to claim 2, wherein the content encoder is configured to not encode one or more of the plurality of portions of the user data, which have been encoded within the first data stream with a bandwidth-dependent quality being equal to the predefined quality, within the second data stream.

4. The apparatus according to claim 3, wherein the content encoder is configured to not encode any of the plurality of portions of the user data, which have been encoded within the first data stream with a bandwidth-dependent quality being equal to the predefined quality, within the second data stream.

5. The apparatus according to claim 1,
wherein the apparatus further comprises a bandwidth determiner,
wherein the first data stream comprises a plurality of segments,
wherein the bandwidth determiner is configured to determine a determined quality as the bandwidth-dependent quality for encoding one of the plurality of portions of the user data depending on a transmission time for transmitting one or more of the segments from the apparatus to the server system, and
wherein the content encoder is configured to encode the one of the plurality of portions of the user data depending on the determined quality.

6. The apparatus according to claim 1, wherein the user data is image data or video data, wherein the bandwidth-dependent quality depends on at least one of a first image resolution and a first image quantization, or depends on at least one of a first video resolution and a first video quantization, and wherein the predefined quality depends on at least one of a second image resolution and a second image quantization, or depends on at least one of a second video resolution and a second video quantization.

7. The apparatus according to claim 1, wherein the user data is audio data, wherein the bandwidth-dependent quality is indicated by a first compression factor, and wherein the predefined quality is indicated by a second compression factor.

8. The apparatus according to claim 1, wherein the apparatus is a mobile device.

9. The apparatus according to claim 8, wherein the user data is a photo being recorded by a camera of the mobile device, or wherein the user data is a video being recorded by the camera of the mobile device, or wherein the user data is an audio recording being recorded by a microphone of the mobile device.

10. A server system, comprising one or more servers,
wherein the server system is configured to receive a first input data stream, wherein a plurality of portions of user data is encoded within the first input data stream, wherein each portion of the plurality of portions of the user data being encoded within the first input data stream has a portion-specific quality, wherein the server system is configured to receive a second input data stream, wherein two or more portions of said plurality of portions of the user data are encoded within the second input data stream, wherein each portion of the plurality of portions of the user data being encoded within the second input data stream has a predefined quality, wherein the portion-specific quality of one or more portions of the plurality of portions of the user data being encoded within the first input data stream is lower than the predefined quality, wherein the one or more servers of the server system are configured to generate one or more output data streams by processing at least one of the first input data stream and the second input data stream such that for each of the one or more output data streams, the plurality of portions of the user data which are encoded within said output data stream are encoded with an output quality, and wherein the one or more servers of the server system are configured to generate each output data stream of the one or more output data streams such that the output quality of the plurality of portions of the user data which are encoded within said output data stream is lower than or equal to a requested quality, wherein the one or more servers of the server system are configured to generate at least one of the one or more output data streams by processing one or more of the plurality of portions of the user data which are encoded with the predefined quality within the second input data stream and by processing one or more of the plurality of portions of the user data which are not encoded within the second input data stream and which are encoded within the first input data stream.

11. The server system according to claim 10, wherein the one or more servers of the server system are configured to generate the one or more output data streams if at least one client requests that one of the one or more output data streams shall be generated, and wherein the one or more servers of the server system are configured to not generate any of the one or more output data streams if no client requests that any of the one or more output data streams shall be generated.

12. The server system according to claim 10, wherein the one or more servers are configured to generate two or more output data streams, if a first client requests a first one of the two or more output data streams with the plurality of portions of the user data which are encoded with a first quality, and if a second client requests a second one of the two or more output data streams with said plurality of portions of the user data which are encoded with a second quality, said second quality being different from said first quality.

13. A server system, comprising one or more servers, wherein the server system is configured to receive a first input data stream, wherein a plurality of portions of user data is encoded within the first input data stream, wherein each portion of the plurality of portions of the user data being encoded within the first input data stream has a portion-specific quality, wherein the server system is configured to receive a second input data stream, wherein two or more portions of said plurality of portions of the user data are encoded within the second input data stream, wherein each portion of the plurality of portions of the user data being encoded within the second input data stream has a predefined quality, wherein the portion-specific quality of one or more portions of the plurality of portions of the user data being encoded within the first input data stream is lower than the predefined quality, wherein the one or more servers of the server system are configured to generate one or more output data streams by processing at least one of the first input data stream and the second input data stream such that for each of the one or more output data streams, the plurality of portions of the user data which are encoded within said output data stream are encoded with an output quality, and wherein the one or more servers of the server system are configured to generate each output data stream of the one or more output data streams such that the output quality of the plurality of portions of the user data which are encoded within said output data stream is lower than or equal to a requested quality, wherein the server system is configured to receive the first input data stream, wherein the plurality of portions of the user data which are encoded within the first input data stream are encoded as one or more quality layers of each of said plurality of portions of the user data, wherein the one or more servers of the server system are configured to acquire the plurality of portions of the user data with the portion-specific quality by processing the one or more quality layers of each of the plurality of portions of the user data being encoded within the first input data stream, wherein the server system is configured to receive the second input data stream, wherein the two or more of the plurality of portions of the user data which are encoded within the second input data stream are encoded as one or more further quality layers of each of the two or more of the plurality of portions of the user data, and wherein the one or more servers of the server system are configured to acquire said two or more of the plurality of portions of the user data with the predefined quality depending on the one or more quality layers of said two or more of the plurality of portions of the user data being encoded within the first input data stream and depending on the one or more further quality layers of the two or more of the plurality of portions of the user data being encoded within the second input data stream.

14. A system comprising:

at least one apparatus for transmitting user data to a server system comprising one or more servers, wherein the apparatus comprises:

a content encoder for encoding a plurality of portions of the user data to acquire a first data stream, wherein the content encoder is configured to encode each of the plurality of portions of the user data with a bandwidth-dependent quality which depends on a bandwidth that is available for transmitting the first data stream from the apparatus to the server system, and a transmitter for transmitting the first data stream from the apparatus to the server system, wherein the content encoder is configured to encode two or more of the plurality of portions of the user data to acquire a second data stream, wherein the content encoder is configured to encode each of the two or more of the plurality of portions of the user data with a predefined quality, wherein the bandwidth-dependent quality of one or more of the plurality of portions of the user data which are encoded within the first data stream is lower than the predefined quality, and wherein the transmitter is configured to transmit the second data stream from the apparatus to the server system, and a server system comprising one or more servers, wherein the server system is configured to receive a first input data stream, wherein the plurality of portions of the user data is encoded within the first input data stream, wherein each of the plurality of portions of the user data being encoded within the first input data stream is encoded with a portion-specific quality, wherein the server system is configured to receive a second input data stream, wherein two or more of the plurality of portions of the user data are encoded within the second input data stream, wherein each of the two or more of portions of the user data being encoded within the second input data stream has a predefined quality, wherein the portion-specific quality of one or more of the portions of the user data being encoded within the first input data stream is lower than the predefined quality, wherein the one or more servers, of the server system are configured to generate one or more output data streams by processing at least one of the first input data stream and the second input data stream such that for each of the one or more output data streams, said plurality of portions of the user data are encoded within said output data stream with an output quality, and wherein the one or more servers of the server system are configured to generate each of the one or more output data streams such that the output quality of said plurality of portions of the user data is lower than or equal to a requested quality, wherein each of the at least one apparatus is configured to transmit a first input data stream and a second input data stream to the server system.

15. The system according to claim 14, wherein the system further comprises one or more consumer clients, wherein each of the one or more consumer clients are configured to request an output data stream from the server system, and wherein the server system is configured to generate the output data stream, being requested by one of the one or more consumer clients, from at least one of the first input data stream and the second input data stream, and to provide the output data stream to said one of the one or more consumer clients.

16. A method for transmitting user data to a server system comprising one or more servers, wherein the method comprises:

encoding a plurality of portions of the user data to acquire a first data stream, wherein encoding each of the plurality of portions of the user data is conducted with a bandwidth-dependent quality which depends on a bandwidth that is available for transmitting the first data stream from an apparatus to the server system, transmitting the first data stream from the apparatus to the server system, encoding two or more of the plurality of portions of the user data to acquire a second data stream, wherein encoding each of said two or more of the plurality of portions of the user data is conducted with a predefined quality, wherein the bandwidth-dependent quality of one or more of the portions of the user data being encoded within the first data stream is lower than the predefined quality, and transmitting the second data stream from the apparatus to the server system, wherein the method further comprises:

encoding each of the plurality of portions of the user data to acquire the first data stream by encoding each portion of the plurality of portions of the user data by encoding one or more quality layers of said one of the plurality of portions of the user data within the first data stream, wherein the bandwidth-dependent quality depends on a number of the quality layers being encoded within the first data stream, determining the number of the quality layers, being encoded within the first data stream, depending on the bandwidth that is available for transmitting the first data stream from the apparatus to the server system, and encoding at least one of the plurality of portions of the user data to acquire the second data stream by encoding one or more further quality layers of said at least one of the plurality of portions of the user data.

17. A method, comprising:

receiving a first input data stream, wherein a plurality of portions of the user data is encoded within the first input data stream, wherein each of the plurality of portions of the user data being encoded within the first input data stream has a portion-specific quality, receiving a second input data stream, wherein two or more of the plurality of portions of the user data are encoded within the second input data stream, wherein each of the plurality of portions of the user data being encoded within the second input data stream has a predefined quality, wherein the portion-specific quality of one or more of the plurality of portions of the user data being encoded within the first input data stream is lower than the predefined quality, generating one or more output data streams by processing at least one of the first input data stream and the second input data stream such that for each of the one or more output data streams, said plurality of portions of the user data which is encoded within said output data stream is encoded with an output quality, and generating each of the one or more output data streams such that the output quality of said plurality of portions of the user data is lower than or equal to a requested quality, wherein the method comprises generating at least one of the one or more output data streams by processing one or more of the plurality of portions of the user data which are encoded with the predefined quality within the second input data stream and by processing one or more of the plurality of portions of the user data which are not encoded within the second input data stream and which are encoded within the first input data stream.

18. A non-transitory digital storage medium having computer-readable code stored thereon to perform the method of claim 16 when said storage medium is run by a computer or signal processor.

19. A non-transitory digital storage medium having computer-readable code stored thereon to perform the method of claim 17 when said storage medium is run by a computer or signal processor.

20. A method, comprising:
receiving a first input data stream, wherein a plurality of portions of the user data is encoded within the first input data stream, wherein each of the plurality of portions of the user data being encoded within the first input data stream has a portion-specific quality,
receiving a second input data stream, wherein two or more of the plurality of portions of the user data are encoded within the second input data stream, wherein each of the plurality of portions of the user data being encoded within the second input data stream has a predefined quality, wherein the portion-specific quality of one or more of the plurality of portions of the user data being encoded within the first input data stream is lower than the predefined quality,
generating one or more output data streams by processing at least one of the first input data stream and the second input data stream such that for each of the one or more output data streams, said plurality of portions of the user data which is encoded within said output data stream is encoded with an output quality, and
generating each of the one or more output data streams such that the output quality of said plurality of portions of the user data is lower than or equal to a requested quality,
wherein the plurality of portions of the user data which are encoded within the first input data stream are encoded as one or more quality layers of each of said plurality of portions of the user data,
wherein the two or more of the plurality of portions of the user data which are encoded within the second input data stream are encoded as one or more further quality layers of each of the two or more of the plurality of portions of the user data, and
wherein the method further comprises:
acquiring the plurality of portions of the user data with the portion-specific quality by processing the one or more quality layers of each of the plurality of portions of the user data being encoded within the first input data stream, and
acquiring said two or more of the plurality of portions of the user data with the predefined quality depending on the one or more quality layers of said two or more of the plurality of portions of the user data being encoded within the first input data stream and depending on the one or more further quality layers of the two or more of the plurality of portions of the user data being encoded within the second input data stream.

21. A non-transitory digital storage medium having computer-readable code stored thereon to perform the method of claim 20 when said storage medium is run by a computer or signal processor.

* * * * *